United States Patent
Caspi et al.

(10) Patent No.: US 10,984,101 B2
(45) Date of Patent: Apr. 20, 2021

(54) METHODS AND SYSTEMS FOR MALWARE DETECTION AND CATEGORIZATION

(71) Applicant: DEEP INSTINCT, Tel Aviv (IL)

(72) Inventors: Guy Caspi, Tel Aviv (IL); Eli David, Holon (IL); Nadav Maman, Hod HaSharon (IL); Ishai Rosenberg, Rosh Ha'a'yin (IL)

(73) Assignee: DEEP INSTINCT, Tel Aviv (IL)

( * ) Notice: Subject to any disclaimer, the term of this patent is extended or adjusted under 35 U.S.C. 154(b) by 181 days.

(21) Appl. No.: 16/010,910

(22) Filed: Jun. 18, 2018

(65) Prior Publication Data

US 2019/0384911 A1    Dec. 19, 2019

(51) Int. Cl.
*G06F 21/56* (2013.01)
*G06F 16/22* (2019.01)
(Continued)

(52) U.S. Cl.
CPC ........ *G06F 21/561* (2013.01); *G06F 16/2228* (2019.01); *G06F 21/562* (2013.01);
(Continued)

(58) Field of Classification Search
CPC .. G06F 21/561; G06F 21/562; G06F 16/2228; G06N 20/00; G06N 20/10;
(Continued)

(56) References Cited

U.S. PATENT DOCUMENTS

| 10,193,902 | B1 | 1/2019 | Caspi |
| 2007/0240217 | A1* | 10/2007 | Tuvell ................. G06F 21/565 726/24 |

(Continued)

OTHER PUBLICATIONS

Backpropagation definition on Wikipedia (May, 2018): https://en.wikipedia.org/w/index.php?title=Backpropagation&oldid=843190925.
(Continued)

*Primary Examiner* — Daniel B Potratz
*Assistant Examiner* — Vu V Tran
(74) *Attorney, Agent, or Firm* — Browdy and Neimark, PLLC

(57) ABSTRACT

A method of determining a category of a malware file, using a malware determination system comprising a machine learning algorithm, the method comprising obtaining a file, which is assumed to constitute malware file, by the malware determination system, building a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, feeding the data structure to the machine learning algorithm of the malware determination system, and providing prospects representative of one or more malware categories to which said file belongs, based on said data structure.

16 Claims, 17 Drawing Sheets

(51) Int. Cl.
  *G06N 3/08*  (2006.01)
  *G06N 20/10*  (2019.01)
  *G06N 3/04*  (2006.01)
  *G06K 9/62*  (2006.01)
  *G06N 20/00*  (2019.01)

(52) U.S. Cl.
  CPC .......... *G06K 9/6267* (2013.01); *G06N 3/084* (2013.01); *G06N 20/00* (2019.01)

(58) Field of Classification Search
  CPC .... G06N 3/084; G06N 3/0445; G06N 3/0454; G06N 3/0472; G06K 9/6267
  See application file for complete search history.

(56) References Cited

U.S. PATENT DOCUMENTS

| | | | | |
|---|---|---|---|---|
| 2019/0007434 | A1* | 1/2019 | McLane | G06N 3/084 |
| 2019/0044964 | A1* | 2/2019 | Chari | G06K 9/6218 |
| 2019/0266492 | A1* | 8/2019 | Harang | G06N 3/082 |

OTHER PUBLICATIONS

Deng, L., & Yu, D. (2014). Deep learning: methods and applications. Foundations and Trends® in Signal Processing, 7(3-4), 197-387.

Bengio, Y. (2009). Learning deep architectures for AI. Foundations and trends® in Machine Learning, 2(1), 1-127.

LeCun, Y., Bengio, Y., & Hinton, G. (2015). Deep learning. nature, 521(7553), 436.

Deep learning definition on Wikipedia (May, 2018): https://en.wikipedia.org/w/index.php?title=Deep_learning&oldid=843604881.

Vincent, P., Larochelle, H., Lajoie, I., Bengio, Y., & Manzagol, P. A. (2010). Stacked denoising autoencoders: Learning useful representations in a deep network with a local denoising criterion. Journal of machine learning research, 11(Dec), 3371-3408.

Larochelle, H., & Bengio, Y. (Jul. 2008). Classification using discriminative restricted Boltzmann machines. In Proceedings of the 25th international conference on Machine learning (pp. 536-543). ACM.

Hinton, G. E., Osindero, S., & Teh, Y. W. (2006). A fast learning algorithm for deep belief nets. Neural computation, 18(7), 1527-1554.

Restricted Boltzmann machine definition on Wikipedia (Apr. 2018): https://en.wikipedia.org/w/index.php?title=Restricted_Boltzmann_machine&oldid=836566616.

Werbos, P. (1974). Beyond Regression: New Tools for Prediction and Analysis in the Behavioral Sciences. Ph. D. dissertation, Harvard University.

Parker, D. B. (1985). Learning-logic (TR-47). Center for Computational Research in Economics and Management Science. MIT-Press, Cambridge, Mass, 8.

Rumelhart, D. E., Hinton, G. E., & Williams, R. J. (1988). Learning representations by back-propagating errors. Cognitive modeling, 5(3), 1.

\* cited by examiner

|   | $C_1$= Trojan | $C_2$=Ransomware | $C_3$=Keylogger |
|---|---|---|---|
| A | 50 | 0 | 10 |
| B | 70 | 70 | 20 |
| C | 70 | 0 | 10 |
| D | 0 | 70 | 40 |

1000

```
1100 ──  Obtaining dictionary $D_{Ci/all}$ (respectively $D_{Ci/Cj}$)
         of a category $C_i$
                    │
                    ▼
1010 ──  Selecting a subset of the features present in
         dictionary $D_{Ci/all}$ (respectively $D_{Ci/Cj}$)
                    │
                    ▼
1020 ──  Storing the selected features in dictionary
         $D'_{Ci/all}$ (respectively $D'_{Ci/Cj}$)
```

Fig. 11

|  | $C_1$= Trojan | $C_2$=Ransomware | $C_3$=Keylogger |
|---|---|---|---|
| A, C, D | 2 | 2 | 2 |
| A, C | 0 | 10 | 5 |
| A, D | 7 | 7 | 7 |
| C, D | 15 | 15 | 15 |

METHODS AND SYSTEMS FOR MALWARE DETECTION AND CATEGORIZATION

TECHNICAL FIELD

The presently disclosed subject matter relates to a solution in the field of malware detection. In particular, it pertains to a solution for determining categories of malware.

BACKGROUND

Malware, short for malicious software, is a software or file used to disrupt computer operation, gather sensitive information, or gain access to private computer systems.

In order to protect computer operation, various methods and systems have been developed in the past to detect malware. The efficient detection of malware is highly challenging, since a vast number of new malware appear every day. For instance, it is believed that approximately 300.000 new malwares per day appeared in the year 2014. Most of these malwares are variants of existing malwares.

FIG. 1 and FIG. 2 describe a prior art method for detecting malware. Most malware detectors which are currently used in the IT industry rely on the solution described in FIGS. 1 and 2.

A file "File 1" is received by the malware detector 1. The malware detector 1 includes a database 2 which stores a plurality of signatures 3. These signatures 3 each represent the content of known malware. For instance, "signature 1" represents the content of a known "malware 1".

The malware detector 1 compares the file "File 1" with each signature. If this comparison shows that the content of File 1 is the same as at least one of the signatures 3, the malware detector outputs a positive answer 4, meaning that File 1 is a malware. If not, the malware detector outputs a negative answer 5, meaning that File 1 is not a malware.

However, as indicated above, a large amount of new malware is created every day. It thus happens frequently that despite the fact that a file is malware, the malware detector is not able to detect it. Indeed, as the malware detector has never encountered such malware in the past, its database does not store a corresponding signature which could help it detect said malware. This is the case even if the new malware was created by making only small modifications to an existing and known malware for which the malware detector stores the corresponding signature.

Once a file had been identified as a malware, prior art solutions attempted to provide the category to which the malware belongs (see FIG. 2).

This was performed by using heuristics, which were obtained mostly manually by skilled professionals such as IT engineers, based on their experience and their understanding of the content of the malware files.

There is now a need to provide new solutions to determine the category of malware.

General Description

In accordance with certain aspects of the presently disclosed subject matter, there is provided a method of training a malware determination system comprising a machine learning algorithm, wherein the malware determination system is configured to identify a category of malware files, the method comprising providing a training set comprising a plurality of malware files, wherein these malware files belong to different categories of malware files, for each of a plurality of said malware files (by e.g. a processing unit), building a data structure representative of features present in said file, based on features present in at least one dictionary, wherein said dictionary stores at least, for each of one or more of category categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, feeding the data structure to the machine learning algorithm of the malware determination system, for providing prospects that the malware file belongs to one or more categories of malware, and updating one or more parameters of at least one model used by the machine learning algorithm of the malware determination system, based at least on prospects provided by the machine learning algorithm whether each malware file belongs to one or more of said plurality of categories of malware files, and at least one real category of each malware file, for training said malware determination system to detect category of malware files fed to the malware determination system.

In addition to the above features, the method according to this aspect of the presently disclosed subject matter can optionally comprise one or more of features (i) to (vii) below, in any technically possible combination or permutation:

i. the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect;

ii. the number of neurons of the output layer is equal to N;

iii. the dictionary comprises at least one of one or more features which are, individually, specific to said category $C_i$ with respect to all other N−1 categories $C_j$ and one or more features which, in combination, are specific to said category $C_i$ with respect to all other N−1 categories $C_j$;

iv. said dictionary stores, for each of one or more of said categories $C_i$, at least some of features $F_{all/Ci}$ which are specific to malware files of all N−1 categories $C_j$ with respect to features of malware files of category $C_i$, according to at least one second specificity criteria, wherein i is different from j;

v. $F_{all/Ci}$ comprises at least one of one or more features, which are, individually, specific to said N−1 categories $C_j$ with respect to category Ci, and one or more features which are, in combination, are specific to said N−1 categories $C_j$ with respect to category $C_i$;

vi. the dictionary is built using at least operations (a) to (c): (a) building at least N first size dictionaries, wherein each first-size dictionary $D_{Ci}$ is associated with a category $C_i$ of malware files, with i from 1 to N, said building comprising, for each category $C_i$, extracting features from malware files of a training set belonging to category $C_i$ and storing them into said dictionary $D_{Ci}$, (b) for each of one or more of categories $C_i$, determining specific features of said category $C_i$, comprising at least one of one or more features which are specific to said category $C_i$ with respect to all other N−1 categories $C_j$, wherein j is different from i, according to at least one specificity criteria, and one or more features which are specific to malware files of all N−1 categories $C_j$ with respect to features of malware files of category $C_i$, according to at least one specificity criteria, wherein i is different from j, (c) building said dictionary based at least on one or more of said specific features;

vii. the method comprises comprising reducing the number of specific features by selecting, among said specific features, at least one of one or more features which, in combination, are specific to said category Ci with respect to all other N−1 categories $C_j$, and one or more features which, in combination, are specific to said N−1 categories $C_j$ with respect to category $C_i$, the method comprises building said dictionary based at least on one or more of said reduced number of specific features.

According to another aspect of the presently disclosed subject matter there is provided a method of training a malware determination system comprising a machine learning algorithm, wherein the malware determination system is configured to identify a category of malware files, the method comprising providing a training set comprising a plurality of malware files, wherein these malware files belong to different categories of malware files, for each of a plurality of said malware files (e.g. by a processing unit), building a data structure representative of features present in said file, based on features present in at least one dictionary, wherein said dictionary stores at least, for each of one or more of categories $C_i$ out of a plurality of N categories of malware files, with i from 1 to N and N>1, one or more features $F_{Ci/Cj}$ which are specific to said category $C_i$ with respect to another category $C_j$, for all j from 1 to N which are different from i, according to at least one first specificity criteria, feeding the data structure to the machine learning algorithm of the malware determination system, for providing prospects that the malware file belongs to one or more categories of malware, and updating one or more parameters of at least one model used by the machine learning algorithm of the malware determination system, based at least on prospects provided by the machine learning algorithm whether each malware file belongs to one or more of categories of malware files, and at least one real category of each malware file, for training said malware determination system to detect category of malware files fed to the malware determination system.

In addition to the above features, the method according to this aspect of the presently disclosed subject matter can optionally comprise one or more of features (viii) to (xiv) below, in any technically possible combination or permutation:

viii. the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect;

ix. the number of neurons of the output layer is equal to N;

x. the dictionary comprises at least one of one or more features which are, individually, specific to said category $C_i$ with respect to said category $C_j$ and one or more features which, in combination, are specific to said category $C_i$ with respect to said category $C_j$;

xi. said dictionary stores, for each of one or more of said categories $C_i$, one or more features $F_{Cj/Ci}$ which are specific to malware files of said category $C_j$ with respect to features of malware files of category $C_i$, according to at least one second specificity criteria, wherein i is different from j;

xii. $F_{Cj/Ci}$ comprises at least one of one or more features, which are, individually, specific to said category $C_j$ with respect to category $C_i$ and one or more features which are, in combination, specific to said category $C_j$ with respect to category $C_i$;

xiii. the dictionary is built using at least operations (a) to (c): (a) building at least N first size dictionaries, wherein each first-size dictionary $D_{Ci}$ is associated with a category $C_i$ of malware files, with i from 1 to N, said building comprising, for each category $C_i$, extracting features from malware files of a training set belonging to category $C_i$ and storing them into said dictionary $D_{Ci}$, (b) for each of one or more of said categories $C_i$, and for each of one or more of categories $C_j$ which are different from $C_i$, with j different from i, determining specific features of said category $C_i$, comprising at least one of one or more features which are specific to said category $C_i$ with respect to said category $C_j$, according to at least one specificity criteria, and one or more features which are specific to said category $C_j$ with respect to said category $C_i$, according to at least one specificity criteria, and (c) building said dictionary based at least on one or more of said specific features;

xiv. the method comprises reducing the number of specific features by selecting, among said specific features, at least one of one or more features which, in combination, are specific to said category $C_i$ with respect to said category $C_j$, and one or more features which, in combination, are specific to said category $C_j$ with respect to said category $C_i$, wherein the method comprises building said dictionary based at least on one or more of said reduced number of specific features.

According to another aspect of the presently disclosed subject matter there is provided a method of determining a category of a malware file, using a malware determination system comprising a machine learning algorithm, the method comprising (e.g. by a processing unit) obtaining a file, which is assumed to constitute malware file, by the malware determination system, building a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, feeding the data structure to the machine learning algorithm of the malware determination system, and providing prospects representative of one or more malware categories to which said file belongs, based on said data structure.

In addition to the above features, the method according to this aspect of the presently disclosed subject matter can optionally comprise one or more of features (xv) to (xvi) below, in any technically possible combination or permutation:

xv. the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect;

xvi. the dictionary stores for each of one or more of said categories $C_i$, one or more features $F_{all/Ci}$ which are specific to malware files of all N−1 categories $C_j$ with respect to features of malware files of category $C_i$, according to at least one second specificity criteria, wherein i is different from j.

In addition to the above features, the method according to this aspect of the presently disclosed subject matter can optionally comprise one or more of features (i), to (iii) and (v) to (vii) above.

According to another aspect of the presently disclosed subject matter there is provided a method of determining a category of a malware file, using a malware determination system comprising a machine learning algorithm, the method comprising (e.g. by a processing unit): obtaining a file, which is assumed to constitute a malware file, by the malware determination system, building a data structure representative of features present in said file, based on features present in at least one dictionary, wherein said dictionary stores at least, for each of one or more of categories $C_i$ out of a plurality of N categories of malware files, with i from 1 to N and N>1, one or more features $F_{Ci/Cj}$ which are specific to said category $C_i$ with respect to another category $C_j$, for all j from 1 to N which is different from i, according to at least one first specificity criteria, feeding the data structure to the machine learning algorithm of the malware determination system, and providing prospects representative of one or more malware categories to which said file belongs, based on said data structure.

In addition to the above features, the method according to this aspect of the presently disclosed subject matter can optionally comprise one or more of features (xvii) to (xviii) below, in any technically possible combination or permutation:
  xvii. the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect;
  xviii. said dictionary stores, for each of one or more of said categories $C_i$, at least some of features $F_{Cj/Ci}$ which are specific to malware files of said category $C_j$ with respect to features of malware files of category $C_i$, according to at least one second specificity criteria, wherein i is different from j.

In addition to the above features, the method according to this aspect of the presently disclosed subject matter can optionally comprise one or more of features (ix), to (x) and (xii) to (xiv) above.

According to another aspect of the presently disclosed subject matter there is provided a system of training a malware determination system comprising a machine learning algorithm, wherein the malware determination system is configured to identify a category of malware file, the system being configured to provide a training set comprising a plurality of malware files, wherein these malware files belong to different categories of malware files, for each of a plurality of said malware files (e.g. by a processing unit), build a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category Ci with respect to all other N−1 categories $C_j$, with j different from i, according to at least one first specificity criteria, feed the data structure to the machine learning algorithm of the malware determination system, for providing prospects that the malware file belongs to one or more categories of malware, and update one or more parameters of at least one model used by the machine learning algorithm of the malware determination system, based at least on prospects provided by the machine learning algorithm whether each malware file belongs to one or more of categories of malware files, and at least one real category of each malware file, for training said malware determination system to detect category of malware file fed to the malware determination system.

In addition to the above features, the system according to this aspect of the presently disclosed subject matter can optionally comprise one or more of features (xix) to (xxv) below, in any technically possible combination or permutation:
  xix. the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect;
  xx. the number of neurons of the output layer is equal to N;
  xxi. the dictionary comprises at least one of one or more features which are, individually, specific to said category $C_i$ with respect to all other N−1 categories $C_j$ and one or more features which, in combination, are specific to said category Ci with respect to all other N−1 categories $C_j$;
  xxii. said dictionary stores, for each of one or more of said categories $C_i$, one or more features $F_{all/Ci}$ which are specific to malware files of all N−1 categories $C_j$ with respect to features of malware files of category $C_i$, according to at least one second specificity criteria, wherein i is different from j;
  xxiii. $F_{all/Ci}$ comprises at least one of one or more features, which are, individually, specific to said N−1 categories $C_j$ with respect to category $C_i$, and one or more features which are, in combination, are specific to said N−1 categories $C_j$ with respect to category $C_i$;
  xxiv. the dictionary is built using at least operations (a) to (c): (a) building at least N first size dictionaries, wherein each first-size dictionary $D_{Ci}$ is associated with a category $C_i$ of malware files, with i from 1 to N, said building comprising, for each category $C_i$, extracting features from malware files of a training set belonging to category $C_i$ and storing them into said dictionary $D_{Ci}$, (b) for each of one or more of categories $C_i$, determining specific features of said category $C_i$, comprising at least one of one or more features which are specific to said category $C_i$ with respect to all other N−1 categories $C_j$, wherein j is different from i, according to at least one specificity criteria, and one or more features which are specific to malware files of all N−1 categories $C_j$ with respect to features of malware files of category $C_i$, according to at least one specificity criteria, wherein i is different from j, (c) building said dictionary based at least on one or more of said specific features;
  xxv. the system is configured to reduce the number of specific features by selecting, among said specific features, at least one of one or more features which, in combination, are specific to said category $C_i$ with respect to all other N−1 categories $C_j$, and one or more features which, in combination, are specific to said N−1 categories $C_j$ with respect to category $C_i$, wherein the system is configured to build said dictionary based at least on one or more of said reduced number of specific features.

According to another aspect of the presently disclosed subject matter there is provided a system of training a malware determination system comprising a machine learning algorithm, wherein the malware determination system is configured to identify a category of malware files, the system being configured to provide a training set comprising a plurality of malware files, wherein these malware files belong to different categories of malware files, for each of a plurality of said malware files (e.g. by a processing unit), build a data structure representative of features present in said file, based on features present in at least one dictionary, wherein said dictionary stores at least, for each of one or more of plurality of categories $C_i$ out of a plurality of N categories of malware files, with i from 1 to N and N>1, one or more features $F_{Ci/Cj}$ which are specific to said category $C_i$ with respect to another category $C_j$, for all j from 1 to N which is are different from i, according to at least one first specificity criteria, feed the data structure to the machine learning algorithm of the malware determination system, for providing prospects that the malware file belongs to one or more categories of malware, and update one or more parameters of at least one model used by the machine learning algorithm of the malware determination system, based at least on prospects provided by the machine learning algorithm whether each malware file belongs to one or more of said plurality of categories of malware files, and at least one real category of each malware file, for training said malware determination system to detect the category of malware files fed to the malware determination system.

In addition to the above features, the system according to this aspect of the presently disclosed subject matter can optionally comprise one or more of features (xxvi) to (xxxi) below, in any technically possible combination or permutation:

xxvi. the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect;

xxvii. the number of neurons of the output layer is equal to N;

xxviii. said dictionary stores, for each of one or more of said categories $C_i$, one or more features $F_{Cj/Ci}$ which are specific to malware files of said category $C_j$ with respect to features of malware files of category $C_i$, according to at least one second specificity criteria, wherein i is different from j;

xxix. $F_{Cj/Ci}$ comprises at least one of one or more features, which are, individually, specific to said category $C_j$ with respect to category $C_i$ and one or more features which are, in combination, specific to said category $C_j$ with respect to category $C_i$;

xxx. the dictionary is built using at least operations (a) to (c): (a) building at least N first size dictionaries, wherein each first-size dictionary $D_{Ci}$ is associated with a category $C_i$ of malware files, with i from 1 to N, said building comprising, for each category $C_i$, extracting features from malware files of a training set belonging to category $C_i$ and storing them into said dictionary $D_{Ci}$, (b) for each of a plurality of one or more of said categories $C_i$, and for each of one or more of categories $C_j$ which are different from $C_i$, with j different from i, determining specific features of said category $C_i$, comprising at least one of one or more features which are specific to said category $C_i$ with respect to said category $C_j$, according to at least one specificity criteria, and one or more features which are specific to said category $C_j$ with respect to said category $C_i$, according to at least one specificity criteria, and (c) building said dictionary based at least on one or more of said specific features;

xxxi. the system is configured to reduce the number of specific features by selecting, among said specific features, at least one of one or more features which, in combination, are specific to said category $C_i$ with respect to said category $C_j$, and one or more features which, in combination, are specific to said category $C_j$ with respect to said category $C_i$, wherein the system is configured to build said dictionary based at least on one or more of said reduced number of specific features.

According to another aspect of the presently disclosed subject matter there is provided a malware determination system comprising a machine learning algorithm, the system being configured to (e.g. by a processing unit) obtain a file, which is assumed to constitute a malware file, build a data structure representative of features present in said file, based on features present in at least one dictionary, wherein said dictionary stores at least, for each of one or more of category categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, feed the data structure to the machine learning algorithm, and provide prospects representative of one or more malware categories to which said file belongs, based on said data structure.

In addition to the above features, the system according to this aspect of the presently disclosed subject matter can optionally comprise one or more of features (xxxii) to (xxxiii) below, in any technically possible combination or permutation:

xxxii. the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect;

xxxiii. the dictionary stores for each of one or more of said categories $C_i$, at least some of features $F_{all/Ci}$ which are specific to malware files of all N−1 categories $C_j$ with respect to features of malware files of category $C_i$, according to at least one second specificity criteria, wherein i is different from j.

In addition to the above features, the system according to this aspect of the presently disclosed subject matter can optionally comprise one or more of features (xx), to (xxi) and (xxiii) to (xxv) above.

According to another aspect of the presently disclosed subject matter there is provided a malware determination system comprising a machine learning algorithm, the system being configured to (e.g. by a processing unit) obtain a file, which is assumed to constitute malware file, build a data structure representative of features present in said file, based on features present in at least one dictionary, wherein said dictionary stores at least, for each of one or more of categories Ci out of a plurality of N categories of malware files, with i from 1 to N and N>1, one or more features $F_{Ci/Cj}$ which are specific to said category $C_i$ with respect to another category $C_j$, for all j from 1 to N which are different from i, according to at least one first specificity criteria, feed the data structure to the machine learning algorithm, and provide prospects representative of one or more malware categories to which said file belongs, based on said data structure.

In addition to the above features, the system according to this aspect of the presently disclosed subject matter can optionally comprise one or more of features (xxxiv) to (xxxv) below, in any technically possible combination or permutation:

xxxiv. the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect;

xxxv. said dictionary stores, for each of one or more of said categories $C_j$, at least some of features $F_{Cj/Ci}$ which are specific to malware files of said category $C_j$ with respect to features of malware files of category $C_i$, according to at least one second specificity criteria, wherein i is different from j.

In addition to the above features, the system according to this aspect of the presently disclosed subject matter can optionally comprise one or more of features (xxvi), to (xxvii) and (xxix) to (xxxi) above.

According to another aspect of the presently disclosed subject matter there is provided a non-transitory storage device readable by a machine, tangibly embodying a program of instructions executable by the machine to perform a method of training a malware determination system comprising a machine learning algorithm, wherein the malware determination system is configured to identify a category of malware files, the method comprising providing a training set comprising a plurality of malware files, wherein these malware files belong to different categories of malware files, for each of a plurality of said malware files (by e.g. a processing unit), building a data structure representative of features present in said file, based on features present in at least one dictionary, wherein said dictionary stores at least, for each of one or more of category categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, feeding the data structure to the machine learning algorithm of the malware determination system, for providing prospects that the malware file belongs to one or more categories of malware, and updating one or more parameters of at least one model used by the machine learning algorithm of the malware determination system, based at least on prospects provided by the machine learning algorithm whether each malware file belongs to one or more of said plurality of categories of malware files, and at least one real category of each malware file, for training said malware determination system to detect category of malware files fed to the malware determination system.

In addition to the above features, the method according to this aspect of the presently disclosed subject matter can optionally comprise one or more of features (i) to (vii) above, in any technically possible combination or permutation.

According to another aspect of the presently disclosed subject matter there is provided a non-transitory storage device readable by a machine, tangibly embodying a program of instructions executable by the machine to perform a method of training a malware determination system comprising a machine learning algorithm, wherein the malware determination system is configured to identify a category of malware files, the method comprising providing a training set comprising a plurality of malware files, wherein these malware files belong to different categories of malware files, for each of a plurality of said malware files (e.g. by a processing unit), building a data structure representative of features present in said file, based on features present in at least one dictionary, wherein said dictionary stores at least, for each of one or more of categories $C_i$ out of a plurality of N categories of malware files, with i from 1 to N and N>1, one or more features $F_{Ci/Cj}$ which are specific to said category $C_i$ with respect to another category $C_j$, for all j from 1 to N which are different from i, according to at least one first specificity criteria, feeding the data structure to the machine learning algorithm of the malware determination system, for providing prospects that the malware file belongs to one or more categories of malware, and updating one or more parameters of at least one model used by the machine learning algorithm of the malware determination system, based at least on prospects provided by the machine learning algorithm whether each malware file belongs to one or more of categories of malware files, and at least one real category of each malware file, for training said malware determination system to detect category of malware files fed to the malware determination system.

In addition to the above features, the method according to this aspect of the presently disclosed subject matter can optionally comprise one or more of features (viii) to (xiv) below, in any technically possible combination or permutation:

According to another aspect of the presently disclosed subject matter there is provided a non-transitory storage device readable by a machine, tangibly embodying a program of instructions executable by the machine to perform a method of determining a category of a malware file, using a malware determination system comprising a machine learning algorithm, the method comprising obtaining a file, which is assumed to constitute malware file, by the malware determination system, building a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, feeding the data structure to the machine learning algorithm of the malware determination system, and providing prospects representative of one or more malware categories to which said file belongs, based on said data structure.

In addition to the above features, the method according to this aspect of the presently disclosed subject matter can optionally comprise one or more of features (xv) to (xvi) above, in any technically possible combination or permutation.

According to another aspect of the presently disclosed subject matter there is provided a non-transitory storage device readable by a machine, tangibly embodying a program of instructions executable by the machine to perform a method of determining a category of a malware file, using a malware determination system comprising a machine learning algorithm, the method comprising obtaining a file, which is assumed to constitute a malware file, by the malware determination system, building a data structure representative of features present in said file, based on features present in at least one dictionary, wherein said dictionary stores at least, for each of one or more of categories $C_i$ out of a plurality of N categories of malware files, with i from 1 to N and N>1, one or more features $F_{Ci/Cj}$ which are specific to said category $C_i$ with respect to another category $C_j$, for all j from 1 to N which is different from i, according to at least one first specificity criteria, feeding the data structure to the machine learning algorithm of the malware determination system, and providing prospects representative of one or more malware categories to which said file belongs, based on said data structure.

In addition to the above features, the method according to this aspect of the presently disclosed subject matter can optionally comprise one or more of features (xvii) to (xviii) above, in any technically possible combination or permutation.

According to another aspect of the presently disclosed subject matter there is provided a method of building a dictionary, for adapting files to the input of a malware determination system comprising a machine learning algorithm, comprising (e.g. by a processing unit) building at least N first size dictionaries, wherein each first-size dictionary $D_{Ci}$ is associated with a category $C_i$ of malware files, with i from 1 to N, said building comprising, for each category $C_i$, extracting features from malware files of a training set belonging to category $C_i$ and storing them into said dictionary $D_{Ci}$, for each of a plurality of one or more of said categories $C_i$, and for each of one or more of categories $C_j$ which are different from $C_i$, with j different from i, determining specific features of said category $C_i$, comprising at least one of one or more features which are specific to said category $C_i$ with respect to said category $C_j$, according to at least one specificity criteria, and one or more features which are specific to said category $C_j$ with respect to said category $C_i$, according to at least one specificity criteria, and building said dictionary based at least on one or more of said specific features, wherein the dictionary dictates, for the files to be fed to the malware determination system, the size and the content of data structure representing said files and suitable for being processed by the machine learning algorithm, for determining prospects representative of one or more malware categories to which said file belongs, based on said data structure.

According to another aspect of the presently disclosed subject matter there is provided a non-transitory storage device readable by a machine, tangibly embodying a program of instructions executable by the machine to perform this method.

According to another aspect of the presently disclosed subject matter there is provided a system configured to build a dictionary, for adapting files to the input of a malware determination system comprising a machine learning algorithm, the system being configured to (e.g. by a processing unit) build at least N first size dictionaries, wherein each first-size dictionary $D_{Ci}$ is associated with a category $C_i$ of malware files, with i from 1 to N, said building comprising, for each category $C_i$, extracting features from malware files of a training set belonging to category $C_i$ and storing them into said dictionary $D_{Ci}$, for each of a plurality of one or more of said categories $C_i$, and for each of one or more of categories $C_j$ which are different from $C_i$, with j different from i, determine specific features of said category $C_i$, comprising at least one of one or more features which are specific to said category $C_i$ with respect to said category $C_j$, according to at least one specificity criteria, and one or more features which are specific to said category $C_j$ with respect to said category $C_i$, according to at least one specificity criteria, and build said dictionary based at least on one or more of said specific features, wherein the dictionary dictates, for the files to be fed to the malware determination system, the size and the content of data structure representing said files and suitable for being processed by the machine learning algorithm, for determining prospects representative of one or more malware categories to which said file belongs, based on said data structure.

According to another aspect of the presently disclosed subject matter there is provided a method of building a dictionary for adapting files to the input of a malware determination system comprising a machine learning algorithm, comprising building (e.g. by a processing unit) at least N first size dictionaries, wherein each first-size dictionary $D_{Ci}$ is associated with a category C of malware files, with i from 1 to N, said building comprising, for each category $C_i$, extracting features from malware files of a training set belonging to category C and storing them into said dictionary $D_{Ci}$, (b) for each of one or more of said categories $C_3$, and for each of one or more of categories $C_j$ which are different from $C_i$, with j different from i, determining specific features of said category $C_i$, comprising at least one of one or more features which are specific to said category $C_i$ with respect to said category $C_j$, according to at least one specificity criteria, and one or more features which are specific to said category $C_j$ with respect to said category $C_i$, according to at least one specificity criteria, and building said dictionary based at least on one or more of said specific features, wherein the dictionary dictates, for the files to be fed to the malware determination system, the size and the content of data structure representing said files and suitable for being processed by the machine learning algorithm, for determining prospects representative of one or more malware categories to which said file belongs, based on said data structure.

According to another aspect of the presently disclosed subject matter there is provided a non-transitory storage device readable by a machine, tangibly embodying a program of instructions executable by the machine to perform this method.

According to another aspect of the presently disclosed subject matter there is provided a system configured to build a dictionary for adapting files to the input of a malware determination system comprising a machine learning algorithm, the system being configured to build (e.g. by a processing unit) at least N first size dictionaries, wherein each first-size dictionary $D_{Ci}$ is associated with a category $C_i$ of malware files, with i from 1 to N, said building comprising, for each category $C_i$, extracting features from malware files of a training set belonging to category $C_i$ and storing them into said dictionary $D_{Ci}$, for each of one or more of said categories $C_i$, and for each of one or more of categories $C_j$ which are different from $C_i$, with j different from i, determine specific features of said category $C_i$, comprising at least one of one or more features which are specific to said category $C_i$ with respect to said category $C_j$, according to at least one specificity criteria, and one or more features which are specific to said category $C_j$ with respect to said category $C_i$, according to at least one specificity criteria, and build said dictionary based at least on one or more of said specific features, wherein the dictionary dictates, for the files to be fed to the malware determination system, the size and the content of data structure representing said files and suitable for being processed by the machine learning algorithm, for determining prospects representative of one or more malware categories to which said file belongs, based on said data structure.

According to some embodiments, the proposed solution provides an efficient way to identify the category of malware.

According to some embodiments, the proposed solution is able to determine the category of malware with an improved precision with respect to conventional solutions.

According to some embodiments, the proposed solution is able to provide, for each category of malware, an assessment (such as prospects/probability) that a given malware belongs to this category. Therefore, a highly relevant output is provided to the user.

According to some embodiments, the proposed solution is able to identify that a malware belongs to at least two different categories.

According to some embodiments, the proposed solution is able to identify, in an automatic way, characteristics which are specific to each category of malware, without requiring skilled professionals to understand the operation of each category of malware.

According to some embodiments, the proposed solution requires less manpower than conventional solutions.

According to some embodiments, the proposed solution provides a malware determination system which can be trained in a quick manner.

According to some embodiments, the malware determination system is trained by processing a large amount of malware files, and the malware determination system is able to process, in real time, each file. A real time detection may include a detection which does not affect the user's experience of the system. According to some embodiments, a real time detection happens before the malware runs (pre-execution), preventing any damage that might be inflicted by the malware.

According to some embodiments, the malware determination system is configured to determine the category of a malware in real time. A real time detection may include a detection which does not affect the user's experience of the system. According to some embodiments, a real time detection happens before the malware runs (pre-execution), preventing any damage that might be inflicted by the malware.

According to some embodiments, the malware determination system can comprise a model which is operative irrespective of the operating system, operating platform, compiler, etc. of the malware. Therefore, a flexible solution is proposed.

According to certain embodiments of the invention, the malware determination system is able to provide several prospects representative of one or more malware categories to which this file belongs, and to combine these prospects in order to provide a binary decision and/or aggregated prospects representative of one or more malware categories to which this file belongs.

According to certain embodiments of the invention, the malware determination system is able to detect both if a malware belongs to a given category, and if a malware does not belong to this given category. Prevention (e.g. file quarantine) or mitigation (e.g. network isolation to prevent a worm spreading) techniques can use this classification to mitigate specific malware category risks in an efficient manner, transparent to the user.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 11 illustrates an embodiment of operations that can be performed to reduce the size of a dictionary storing features specific to each malware category;

FIG. 12 illustrates a non-limitative example of the method of FIG. 11;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "adapting", "providing", "identifying", "building", "determining", "extracting", "reducing", "concatenating" or the like, refer to the action(s) and/or process(es) of a processing unit that manipulates and/or transforms data into other data, said data represented as physical, such as electronic, quantities and/or said data representing the physical objects.

The term "processing unit" covers any computing unit or electronic unit with data processing circuitry that may perform tasks based on instructions stored in a memory, such as a computer, a server, a chip, a hardware processor, etc. It encompasses a single processor or multiple processors, which may be located in the same geographical zone or may, at least partially, be located in different zones and may be able to communicate together.

The term "memory" as used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

Figure 1:
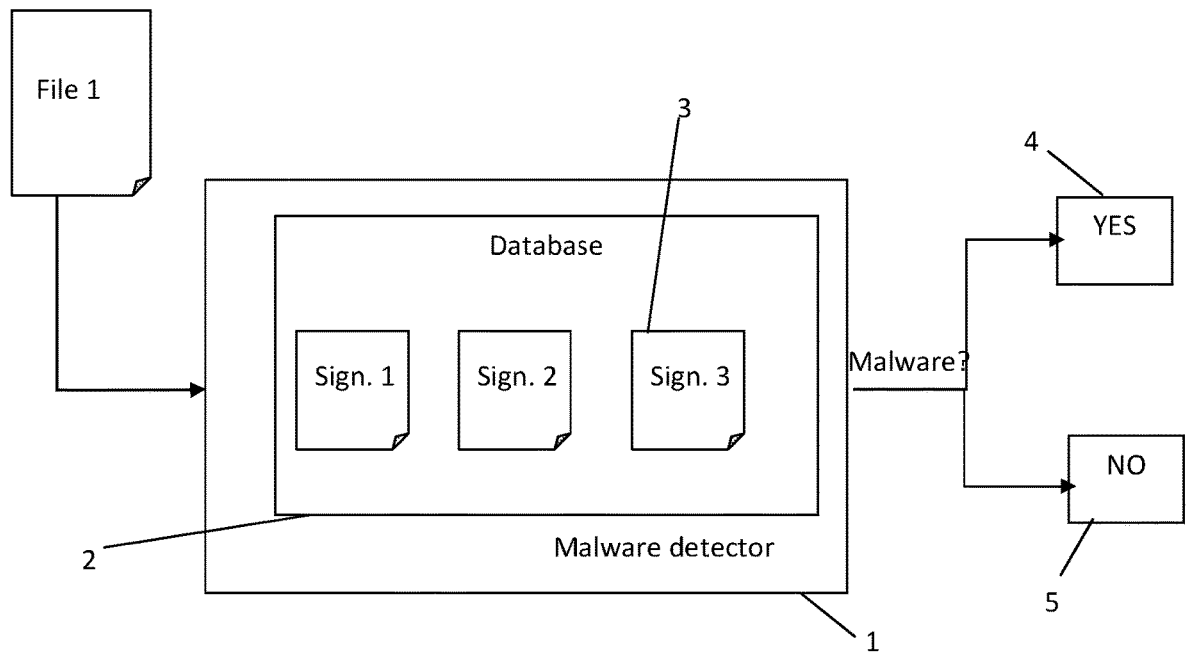
FIG. 1 illustrates a diagram of a malware detector according to a prior art solution.
Figure 2:
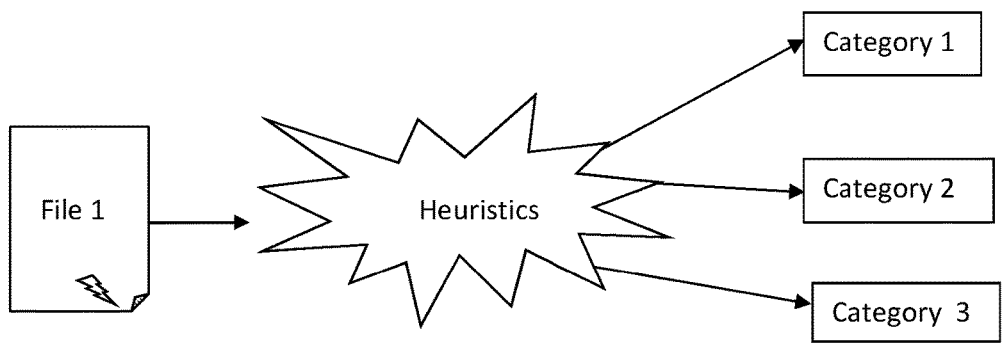
FIG. 2 illustrates a prior art solution for determining a malware category of a file detected as a malware.
Figure 3:
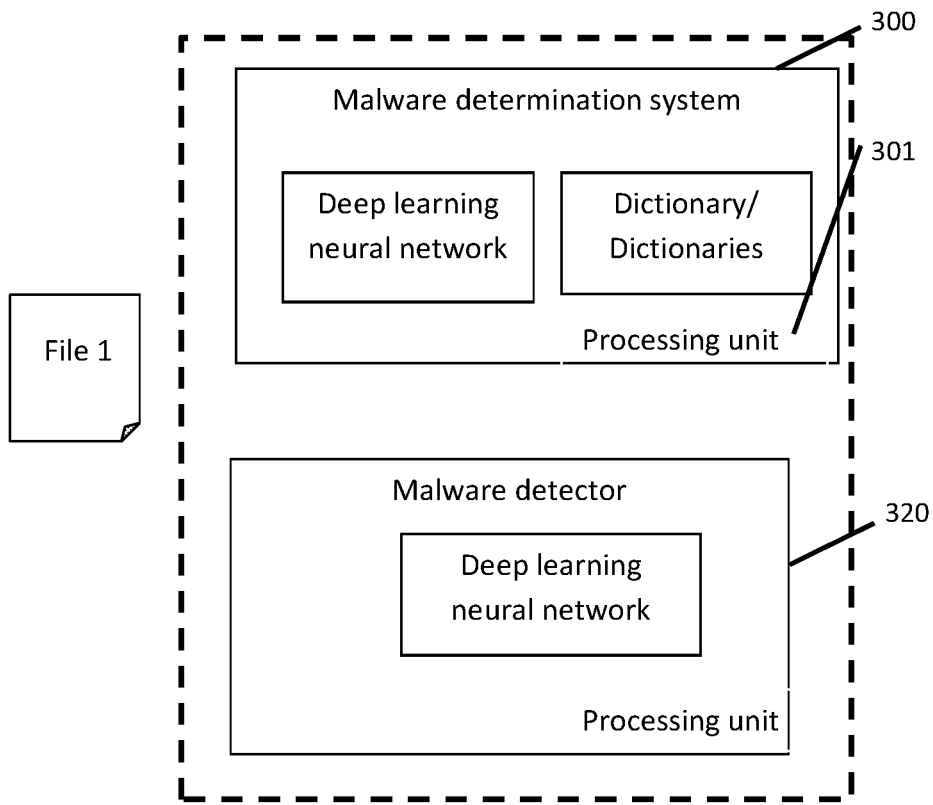
FIG. 3 illustrates a possible embodiment of a malware determination system.

FIG. 3 illustrates a possible embodiment of a malware determination system 300.

The malware determination system 300 can operate on (or can comprise) a processing unit 301, and can comprise (or communicate with) a storage unit (not represented). The storage unit can comprise at least one memory. According to some embodiments, the storage unit is not located at the same location as the processing unit but data communication using any known protocol or network can be performed between them.

The malware determination system 300 can comprise a machine learning algorithm, such as a deep learning neural network (e.g. deep learning algorithm) stored in the memory. This machine learning algorithm can comprise a linear machine learning algorithm (such as SVM), or a nonlinear machine learning algorithm (such as a deep learning algorithm).

Deep learning is a branch of machine learning based on a set of algorithms that attempt to model high-level abstractions in data by using multiple processing layers with complex structures or otherwise, composed of multiple non-linear transformations.

Deep learning algorithms are known per se. They may be implemented in several ways, such as Deep neural networks, Deep belief networks, Convolutional neural networks, Convolutional Deep Belief Networks, Stacked (Denoising) Auto-Encoders, Deep stacking networks, and Deep Recurrent Neural Networks.

Various articles describe the principles of deep learning algorithms, such as: Deng, L., Yu, D. (2014) "Deep Learning: Methods and Applications" Foundations and Trends in Signal Processing 7: 3-4., Bengio, Yoshua (2009), "Learning Deep Architectures for AI", Foundations and Trends in Machine Learning 2 (1): 1-127, Yann LeCun, Yoshua Bengio, & Geoffrey Hinton, Deep Learning, Nature 521, 436-444, 2015, and Wikipedia, https://en.wikipedia.org/wiki/Deep_learning. These documents are incorporated herein by reference.

According to some embodiments, the malware determination system 300 can store, e.g. in its memory, at least one dictionary storing a plurality of file features. The dictionary will be described in detail hereinafter.

This dictionary can be used to convert the files that are to be fed to the machine learning algorithm of the malware determination system, in order to determine the prospects representative of one or more categories of malware to which these files belong.

According to some embodiments, the malware determination system 300 can exchange data with other systems or units.

According to some embodiments, the malware determination system 300 can exchange data with a malware detector 320.

According to some embodiments, the malware detector 320 is configured to detect whether a file constitutes malware or not.

As shown in FIG. 3, according to some embodiments, the malware detector 320 can also comprise a deep learning neural network operable on a processing unit.

In particular, according to some embodiments, the malware detector 320 can provide prospects that a given file constitutes malware. In some embodiments, the malware detector 320 can be in compliance with one or more of the embodiments described in U.S. Ser. No. 14/929,902, which is incorporated herein by reference in its entirety.

If a given file is considered as a malware by the malware detector 320, the malware determination system 300 can determine one or more categories of malware to which this given file belongs, according to one or more of the methods described hereinafter.

Although the malware determination system 300 and the malware detector 320 have been depicted as separate units, according to some embodiments the malware determination system 300 and the malware detector 320 can be run e.g. on the same processing unit. According to some embodiments, a common deep learning neural network can be shared, which can comprise at least one first predictive model for determining that a file constitutes malware, and at least one second predictive model for determining a category of malware.

According to some embodiments, the malware determination system 300 can communicate with one or more user interface(s), such as a screen of a computer or any electronic device. The malware determination system 300 can provide an output representative of the category of malware, which can be displayed e.g. to a user, through the user interface (e.g. a graphical interface displayed on a screen).

Figure 4:
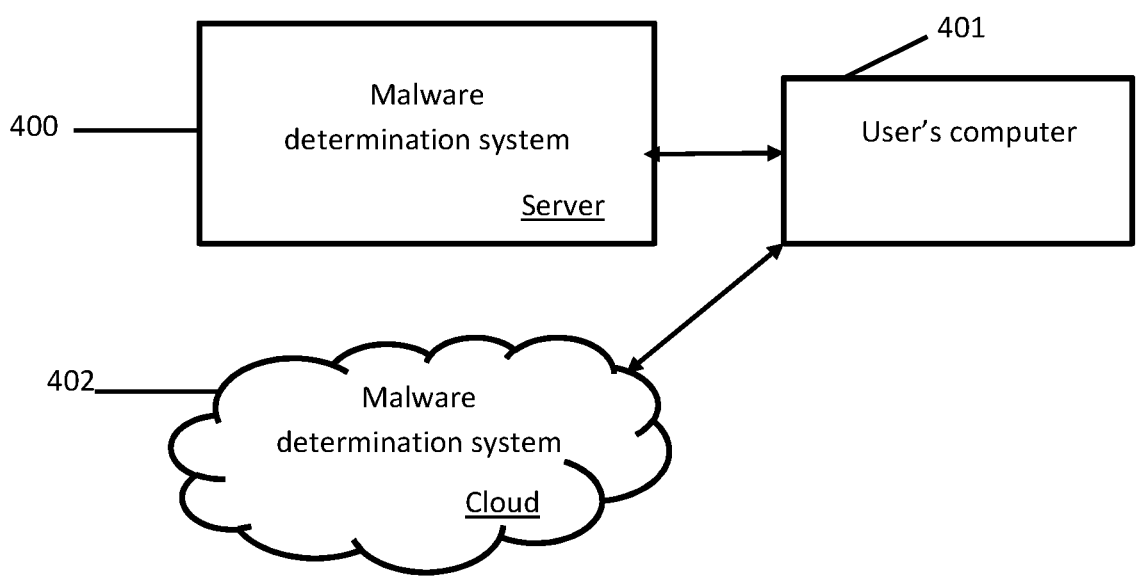
FIG. 4 illustrates possible locations of the malware determination system.

Attention is drawn to FIG. 4.

According to some embodiments, the malware determination system can be located on a server 400 which communicates with at least one user's computer 401 (or a user's server).

According to some embodiments, the malware determination system can be stored in particular on a cloud 402 which communicates with at least one user's computer 401 (or a user's server).

According to some embodiments, the malware determination system can be located on the user's computer 401 itself.

According to some embodiments, the malware determination system can be distributed among various locations (external server, cloud, user's computer, etc.).

The same applies to the malware detector (see FIG. 3), which can be stored e.g. on a server, and/or on a cloud, and/or on the user's computer itself. The malware detector and the malware determination system are not necessarily located at the same location.

When a file is received by the user's computer, and it is determined that this file constitutes malware, this file can be sent to the malware determination system for analysis, which can output one or more categories of malware to which this malware file is assumed to belong.

Figure 5:
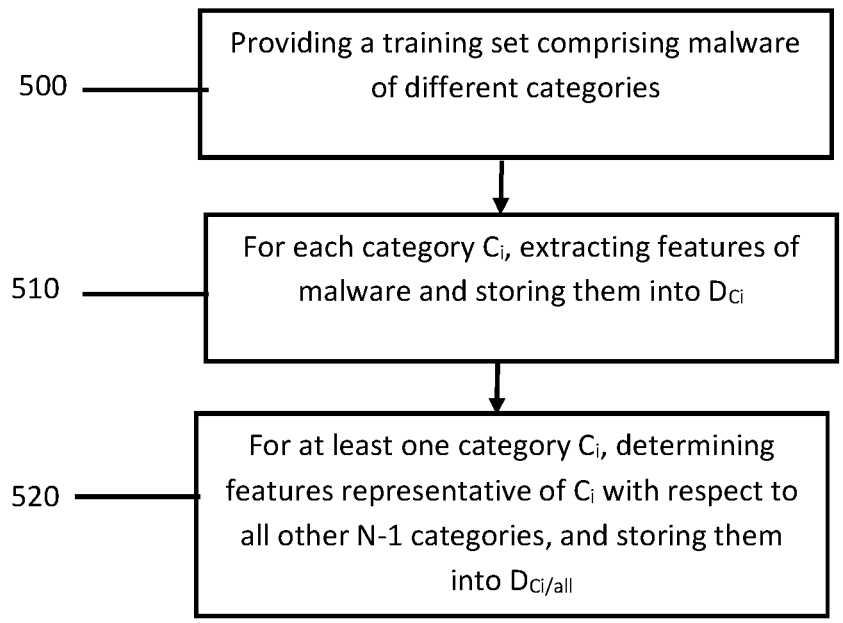
FIG. 5 illustrates operations that can be performed in a method of building a dictionary which stores features specific to each category of malware.

Attention is now drawn to FIG. 5.

In order to determine the category (or categories) to which a malware belongs, a method can comprise building a dictionary storing features which are relevant for determining this category, and which can be used for adapting the file to the input of the malware determination system.

The dictionary can be e.g. a data structure storing one or more features.

Figure 13:
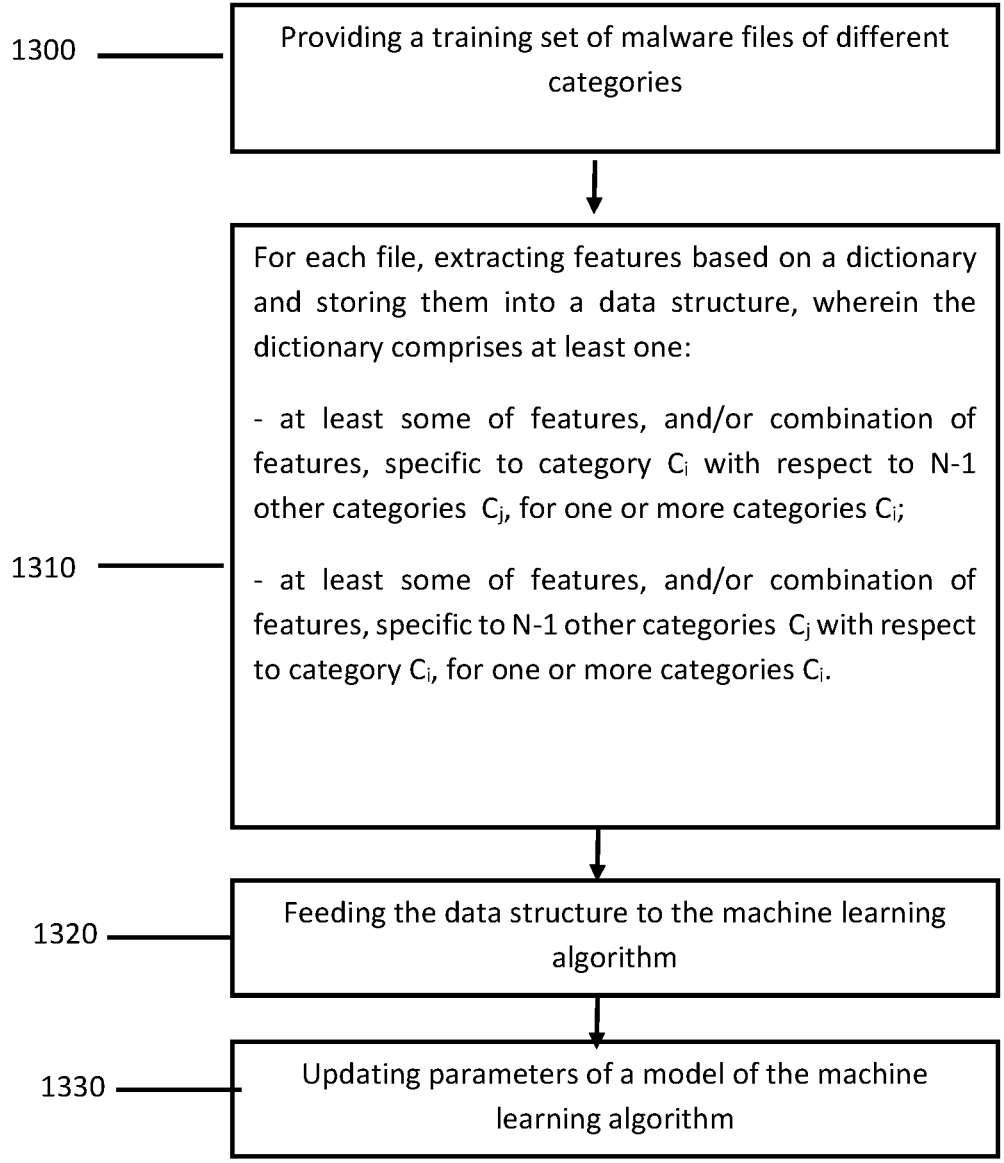
FIG. 13 illustrates an embodiment of a method of training a machine learning algorithm of a malware determination system.
Figure 15:
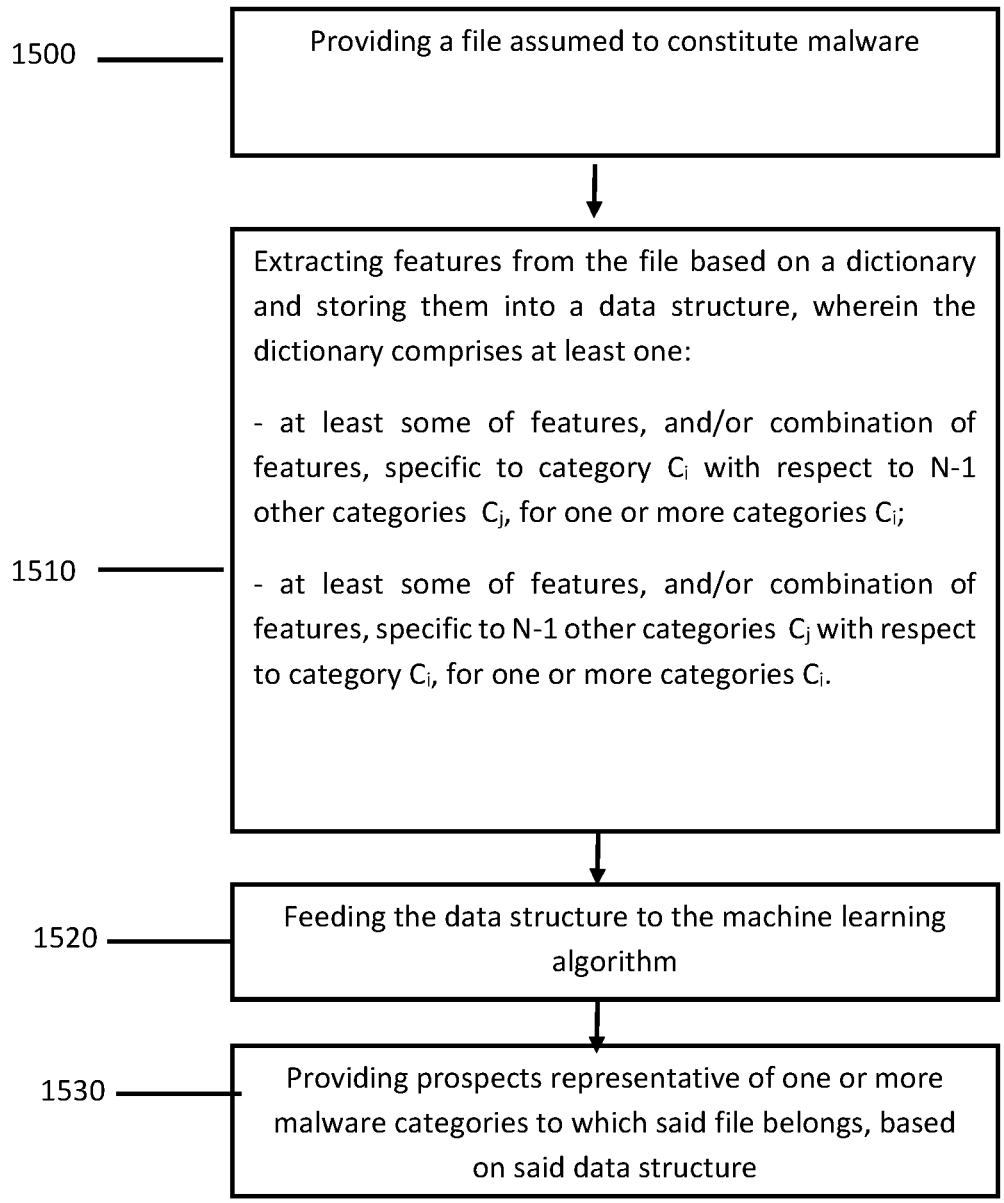
FIG. 15 illustrates an embodiment of a method of detecting a category of a malware using a machine learning algorithm of a malware determination system.

According to some embodiments, the dictionary is used to build a data structure representing each file (see e.g. FIGS. 13 and 15). As a consequence, it dictates, for a file to be fed to the machine learning algorithm, the size and the content of a data structure representing this file and suitable for being processed by the machine learning algorithm, for providing prospects representative of one or more malware categories to which this file belongs, based on said data structure.

The method can comprise operation 500, in which a training set comprising a plurality of malware files is provided.

Malware files of the training set can encompass various types of files, such as software, images, texts, data, portable executable files, webpage, etc. According to certain embodiments, at least some of the files of the training set are operable on different operating platforms/operating systems (e.g. Windows, Apple, Linux, etc.). In other words, a first subset of the malware files is operable on a first operating system and a second subset of the files is operable on a second operating system, different from the first one. According to certain embodiments, they are operable on different computing units (computer, server, Smartphone, etc.).

For instance, thousands or millions of malware files may be used. These numbers are non-limiting examples.

The training set is particular in that the malware files belong to at least N different categories of malware files, wherein N>1. Examples of categories of malware files include e.g. Trojan horses, ransomware, worms, key logger, dropper, backdoor, spyware, virus, adware, etc.

Therefore, in the training set, some of the malware files belong to a first malware category, some of the malware files belong to a second malware category, etc. In some embodiments, at least some of the files can belong to two categories or more. For example, a malware can belong both to category "ransomware" and also to category "worms".

According to some embodiments, the category of each malware file of the training set is known in advance, and can be stored e.g. in a memory. In some embodiments, each file can be labelled with its category.

In some embodiments, a first training set can be built for malware (which includes e.g. backdoor, spyware, virus, worms, ransomware, dropper, etc.) and a second training set can be built for PUA (potential unwanted applications, such as hacking tools, miners, downloader, toolbar, fake app, etc.). In this case, different machine learning (e.g. deep learning algorithm) models can be used and trained, one for malware, and one for PUA. This is however not mandatory.

The method can further comprise (see operation 510 in FIG. 5), for each category (assume categories $C_1$ to $C_N$ are present), extracting features from malware files of this category, and storing them into a first size dictionary. For each of a plurality of these categories $C_i$, a first size dictionary $D_{Ci}$ can be created.

According to some embodiments, the first size dictionary $D_{Ci}$ stores, for a given category $C_i$, all possible different features that were extracted from the malware files of this category.

According to some embodiments, data representative of the level of occurrence of each extracted feature can be stored (for each category). This level of occurrence can be stored in a memory, such as memory of the malware determination system. In some embodiments, it can be stored in the dictionary $D_{Ci}$. This data can be used for further processing, and in particular to build another dictionary which is restricted to features specific to each category (see hereinafter e.g. FIGS. 5, 5A, 6 and 6A).

This occurrence can be stored e.g. as an absolute value (number of times this feature was extracted from malware files of this category), or as a ratio (percentage reflecting the frequency at which this feature appears in malware files of this category), or as any other representative data.

Assume a feature X was extracted from a first malware file of category $C_1$. Then, if this feature X is identified as present in a second malware file, it is not necessary to store it again since it is already stored in the dictionary $D_1$. However, the level of occurrence of this feature X in this category $C_1$ can be updated based on this new extraction of feature X.

If another feature Y is extracted from this second malware file, which was not present in the first malware file, this feature Y can be stored in the dictionary Di.

Various examples and embodiments of the features that can be extracted will be provided hereinafter.

Figure 4A:
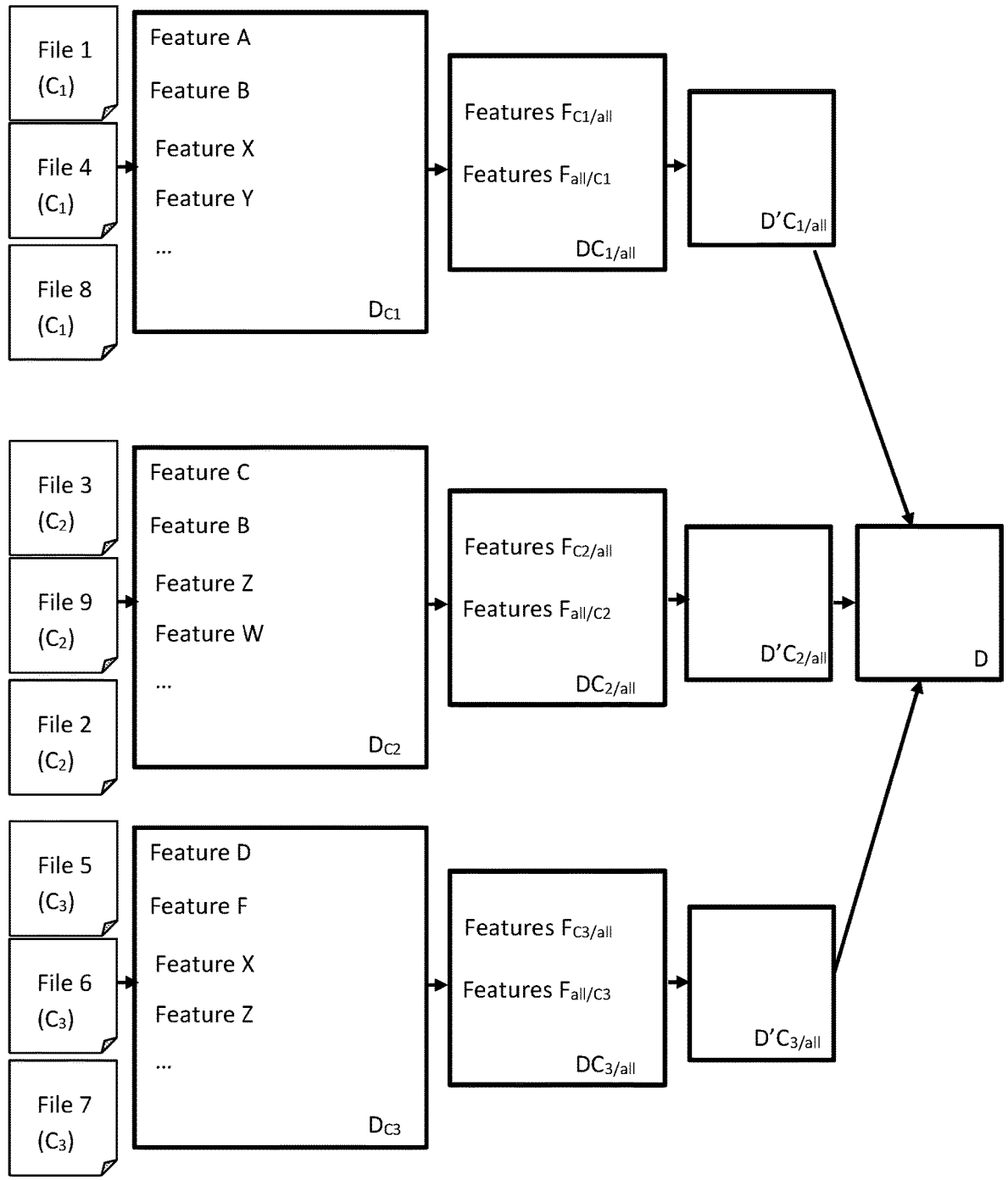
FIG. 4A illustrates a non-limitative example of building a dictionary which stores features specific to each category of malware, which relies on operations described in FIGS. 5 and 5A.

In the non-limitative example of FIG. 4A, three categories $C_1$ to $C_3$ are depicted, and three first size dictionaries $D_{C1}$ to $D_{C3}$ are built, one for each category.

If a file belongs to two or more categories, the features extracted from this file can be stored in the dictionaries associated to these two or more categories.

The method can comprise, for at least one category $C_i$, or, in some embodiments, for each category ($C_1$ to $C_N$), determining features $F_{Ci, spec}$ which are representative or specific to this category $C_i$ with respect to all other N−1 categories $C_j$, with j different from i (operation 520 in FIG. 5). In particular, features specific to category Ci, with respect to all other N−1 categories $C_j$ (with j different from i) viewed as a consolidated group, can be determined.

This specificity can be assessed according to at least one first specificity criteria.

Embodiments for determining these features will be described hereinafter.

The features specific to category $C_i$, with respect all other N−1 categories $C_j$, can be stored e.g. in a category-specific dictionary $D_{Ci/all}$.

According to some embodiments, these features specific to category $C_i$ can comprise features $F_{Ci/all}$ which reflect features that are statistically more present in category $C_i$ than in all other N−1 categories $C_j$, with i different from j. In other words, the presence of one of these features $F_{Ci/all}$ in a given malware file can provide some indications that this file belongs to category $C_i$, since they are more present in this category than in all other N−1 categories.

In some embodiments, each feature present in a given dictionary $D_{Ci}$ is examined separately, and it is determined if this feature has some statistical representation in category $C_i$ which is significant with respect to the other N−1 categories.

In the example of FIG. 4, for category $C_1$, these features can be features $F_{C1,all}$ that are statistically more present in malware of category $C_1$ than in malware of all other categories $C_2$ and $C_3$.

Features $F_{C1/all}$ can be stored in in the category-specific dictionary $D_{C1/all}$.

The same holds true for each category $C_2$ and $C_3$.

According to some embodiments, features representative of a given category $C_i$ with respect to all other N−1 categories can comprise features $F_{all/Ci}$.

Features $F_{all/Ci}$ can comprise features specific to malware files of all N−1 categories $C_j$ with respect to features of malware files of category $C_i$, according to at least one second specificity criteria, wherein i is different from j. In some embodiments, the first and second specificity criteria can be identical, but this is not mandatory.

In some embodiments, for a given category $C_i$, each feature present in the other N−1 dictionaries $D_{Cj}$ (with j different from i) is examined separately, and it is determined if this feature has some statistical representation in the other N−1 categories $C_j$ which is significant with respect to the current category $C_i$.

In other words, features $F_{all/Ci}$ can reflect features that are statistically more present in all other N−1 categories $C_j$ than in category $C_i$.

These features are therefore features that are generally not present, or less present, in category $C_j$.

The presence of one or more of these features in a malware can provide some indications on the fact that the malware does not belong to category $C_i$.

Features $F_{all/Ci}$ can be also stored into the category-specific dictionary $D_{Ci/all}$.

Therefore, according to some embodiments, for at least one category $C_i$ of malware, or for each category of malware, a category-specific dictionary $D_{Ci/all}$ is obtained, storing at least one of:
- features $F_{Ci/all}$, which represent features specifically present in malware of category Ci with respect to malware of the N−1 other categories Cj (j different from i). In some embodiments, features $F_{Ci/all}$ are features for which each feature viewed individually is specific to $C_i$; and
- features $F_{all/Ci}$, which represent features specifically present in malware of all other N−1 categories $C_j$ with respect to malware of category Ci (j different from i—in other words, these features are features statistically less present, or absent, in category $C_i$, with respect to the other N−1 categories). In some embodiments, features $F_{all/Ci}$ are features for which each feature viewed individually is specific to N−1 categories $C_j$.

Figure 5A:
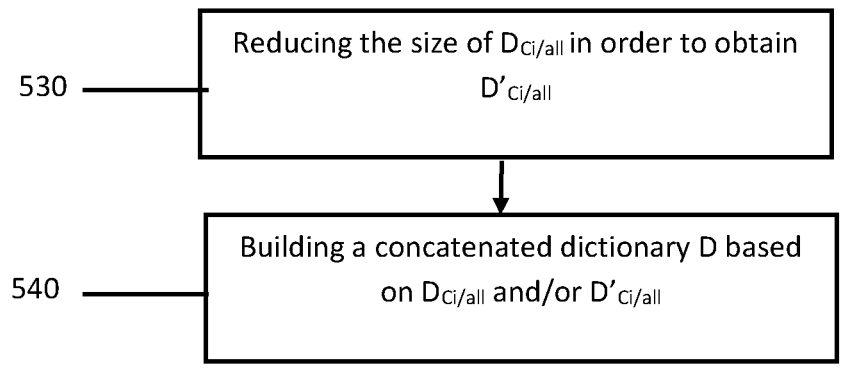
FIG. 5A illustrates other operations that can be performed in a method of building a dictionary which stores features specific to each category of malware.

As shown in FIGS. 4A and 5A, according to some embodiments, the size of each category-specific dictionary $D_{Ci/all}$ can be reduced (operation 530), in order to obtain category-specific dictionary $D'_{Ci/all}$.

This can comprise selecting only a subset of the features present in the category-specific dictionary $D_{Ci/all}$, in order to obtain category-specific dictionary $D'_{Ci/all}$ of reduced size.

Various reduction methods will be described hereinafter (see e.g. FIG. 11).

According to some embodiments, a dictionary D can be built (operation 540) based on dictionaries $D'_{Ci/all}$. According to some embodiments, D can be the concatenation of all dictionaries $D'_{Ci/all}$.

In some embodiments, D can be the concatenation of all dictionaries $D_{Cj/all}$ (that is to say before their reduction).

Dictionary D can be used, as explained hereinafter, to build a data structure (vector) representative of each malware file and suitable to be processed by the deep learning algorithm, for determining prospects of whether a malware file belongs to one or more malware categories.

In some embodiments, the size of each dictionary $D_{Ci}$ can be around 4 GB, the size of each category-specific dictionary $D_{Ci/all}$ can be around 600 KB, and the size of each reduced category-specific dictionary $D'_{Ci/all}$ can be around 10 KB. If D is the concatenation of all dictionaries $D'_{Ci/all}$, then its size can be around N*10 KB. These numbers are non-limiting examples.

Figure 6:
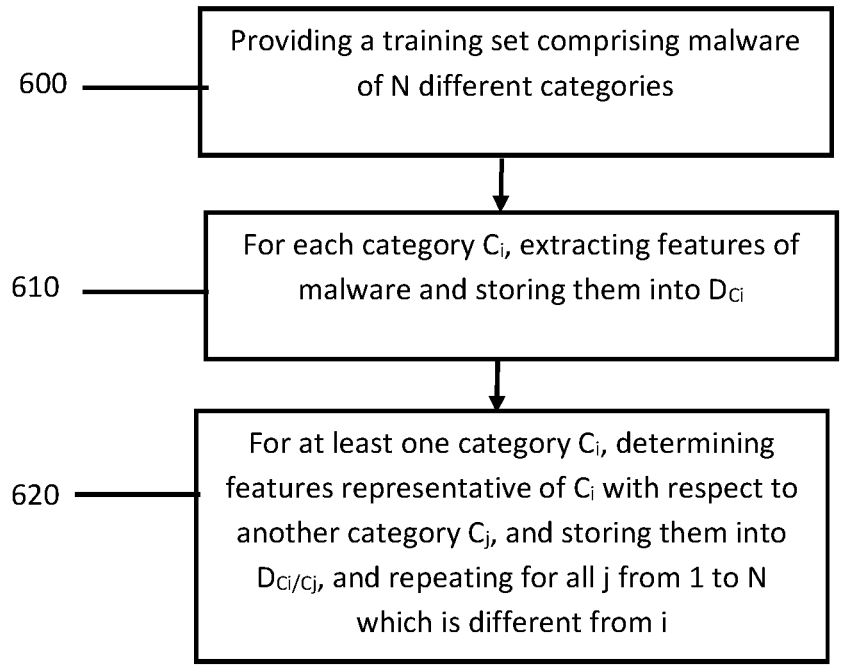
FIG. 6 illustrates operations that can be performed in another method of building a dictionary which stores features specific to each category of malware.

Attention is now drawn to FIG. 6.

As mentioned above, in order to determine the category (or categories) to which a malware belongs, a method can comprise building a dictionary storing features which are relevant to this category, and which can be used for adapting the file to the input of the machine learning algorithm of the malware determination system. The dictionary can be e.g. a data structure storing one or more features.

Another method of building a dictionary will now be described with reference to FIGS. 6 and 7.

The method can comprise operation 700, in which a training set comprising a plurality of malware files is provided.

Operation 600 is similar to operation 500 and is not described again.

The method can comprise (see operation 610 in FIG. 6), for each category (assume categories $C_1$ to $C_N$ are present, with N>1), extracting features from malware files of this category, and storing them into a first size dictionary. For each category $C_i$, a first size dictionary $D_{Ci}$ can be created (operation 610).

Operation 610 is similar to operation 510 and is not described again.

Figure 7:
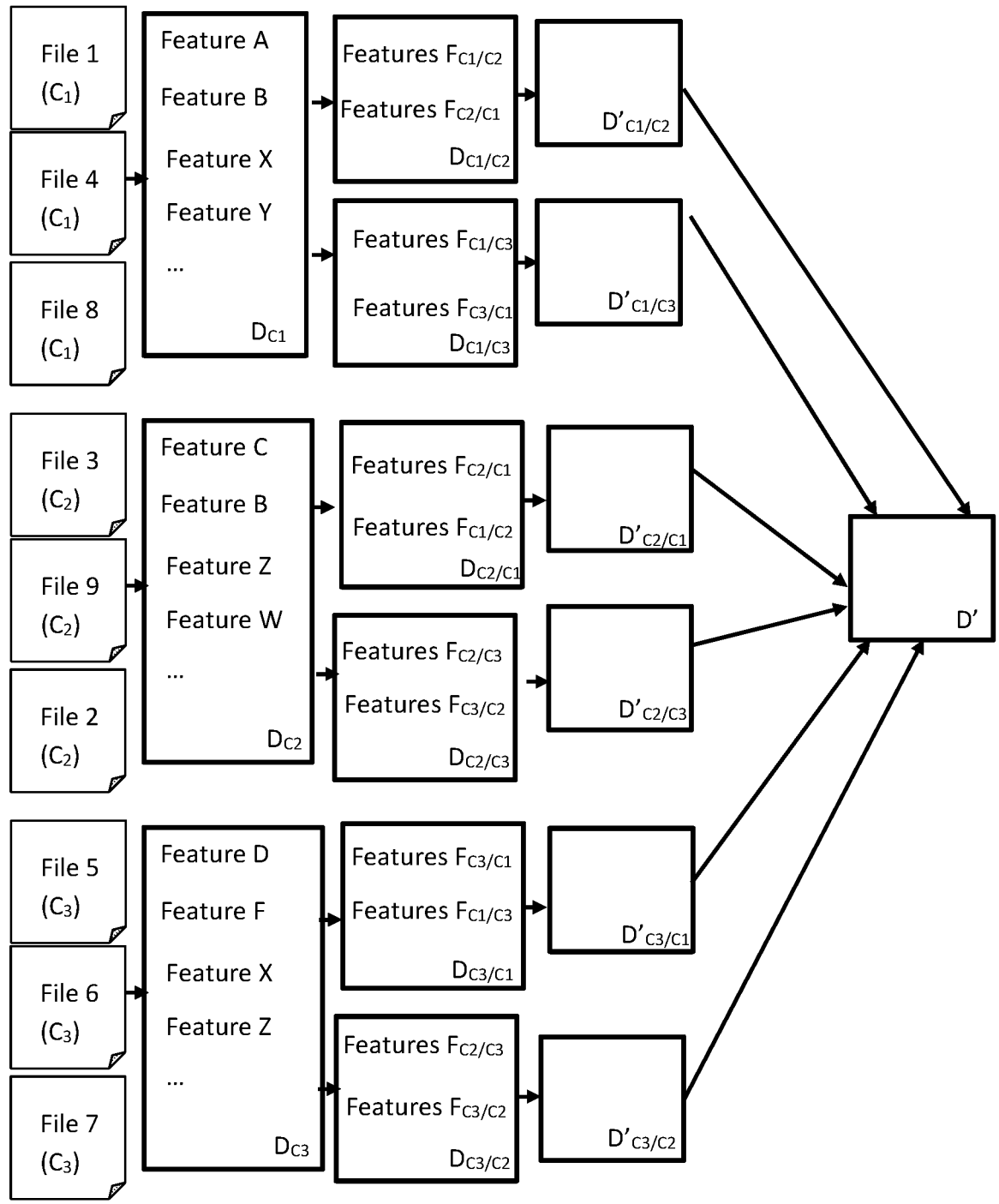
FIG. 7 illustrates a non-limitative example of the methods of FIGS. 6 and 6A.

In the non-limitative example of FIG. 7, three categories $C_1$ to $C_3$ are depicted, and three first size dictionaries $D_1$ to $D_3$ are built, one for each category. This is however not limitative and only two categories can be used, or more than three categories.

If a file belongs to two or more categories, the features extracted from this file can be stored in the dictionaries associated to these two or more categories.

The method can comprise, for at least one category $C_i$, or, in some embodiments, for each category ($C_1$ to $C_N$), features $F_{Ci/Cj}$ which are specific to said category $C_i$ with respect to another category $C_j$, for all j from 1 to N which is different from i, according to at least one first specificity criteria (operation 620 in FIG. 6). In this embodiment, features of category $C_i$ are not assessed with respect to features of all other N−1 categories viewed as a consolidated group, but rather with respect to each of the other categories Cj (separately).

Features $F_{Ci/Cj}$ can be stored in a category-specific dictionary $D_{Ci/Cj}$.

In the example of FIG. 7, assume features specific to category $C_1$ need to be identified. Features specific to category $C_1$ with respect to category $C_2$ can be determined ("$F_{C1/C2}$"), and can be stored in category-specific dictionary $D_{C1/C2}$. Features specific to category $C_1$ with respect to category $C_3$ can be determined ("$F_{C1/C3}$"), and can be stored in category-specific dictionary $D_{C1/C3}$, etc. The same determination can be applied similarly to category $C_2$ (features $F_{C2/C1}$ and $F_{C2/C3}$ are obtained, and respectively stored in $D_{C2/C1}$ and $D_{C2/C3}$), and to category $C_3$ (features $F_{C3/C1}$ and $F_{C3/C2}$ are obtained, and respectively stored in $D_{C3/C1}$ and $D_{C3/C2}$).

According to some embodiments, the features specific to category $C_i$ with respect to another category $C_j$ can comprise features $F_{Ci,Cj}$ which reflect features that are statistically more present in category $C_i$ than in the other $C_j$, with i different from j. In other words, the presence of these features $F_{Ci/Cj}$ in a given malware file can be indicative that there are more prospects that the malware belongs to category $C_i$ than to category Cj.

According to some embodiments, for each of one or more of the categories Ci, features $F_{Cj/Ci}$ can be determined. Features $F_{Cj/Ci}$ are specific to malware files of category $C_j$ with respect to features of malware files of category Ci, according to at least one second specificity criteria, for all j from 1 to N which is different from i. Features $F_{Cj/Ci}$ can be stored in the category-specific dictionary $D_{Ci/Cj}$.

In other words, for a given category $C_i$, features $F_{Cj/Ci}$ that are statistically more present in another category $C_j$ than in this category $C_i$ can be stored in the dictionary $D_{Ci/Cj}$. Presence of these features can indicate that there are higher prospects that the malware does not belong to category $C_i$, and that there are some prospects that the malware belongs to category $C_j$.

For example, in FIG. 7, for category $C_i$, features $F_{C2/C1}$ can be determined (corresponding to features which are more present in $C_2$ than in $C_1$) and stored in $D_{C1/C2}$. Feature $F_{C3/C1}$ can be determined (corresponding to features which are more present in $C_3$ than in $C_1$) and stored in $D_{C1/C3}$.

For category $C_2$, features $F_{C3/C2}$ can be determined (corresponding to features which are more present in $C_3$ than in $C_2$) and stored in $D_{C2/C3}$. Feature $F_{C1/C2}$ can be determined (corresponding to features which are more present in $C_1$ than in $C_2$) and stored in $D_{C2/C1}$.

For category $C_3$, features $F_{C1/C3}$ can be determined (corresponding to features which are more present in $C_1$ than in $C_3$) and stored in $D_{C3/C1}$. Feature $F_{C2/C3}$ can be determined (corresponding to features which are more present in $C_2$ than in $C_3$) and stored in $D_{C3/C2}$.

As shown in FIG. 7, in practice, there is some redundancy in the building of the dictionaries.

According to some embodiments, if N categories of malware are present, N*N−1 dictionaries $D_{Ci/Cj}$ are obtained.

However, dictionary $D_{Ci/Cj}$ comprises similar features to dictionary $D_{Cj/Ci}$. As a consequence it is enough to build dictionary $D_{Ci/Cj}$ once only. Therefore, in practice, according to some embodiments, only (at maximum) (N*N−1)/2 dictionaries $D_{Ci/Cj}$ are built. In the example of FIG. 7, it is enough to build e.g. $D_{C1/C2}$, $D_{C1/C3}$ and $D_{C3/C2}$.

Therefore, according to some embodiments, for at least one category $C_i$ of malware, or for each category of malware, one or more category-specific dictionaries $D_{Ci/Cj}$ are obtained, storing at least one of features $F_{Ci/Cj}$, which represent features specifically present in malware of category $C_i$ with respect to another category $C_j$ (for each of all j from 1 to N which is different from i). In some embodiments, features $F_{Ci/Cj}$ are features wherein each feature viewed individually is specific to $C_i$ with respect to $C_j$; and features $F_{Cj/Ci}$ which are specific to malware files of category $C_j$ with respect to features of malware files of category $C_i$, according to a second specificity criteria, for each of all j from 1 to N which is different from i (j different from i—in other words, these features are features statistically less present, or absent, in category $C_i$, than in the compared category $C_j$). In some embodiments, features $F_{Cj/Ci}$ are features wherein each feature viewed individually is specific to $C_j$ with respect to $C_i$.

Figure 6A:
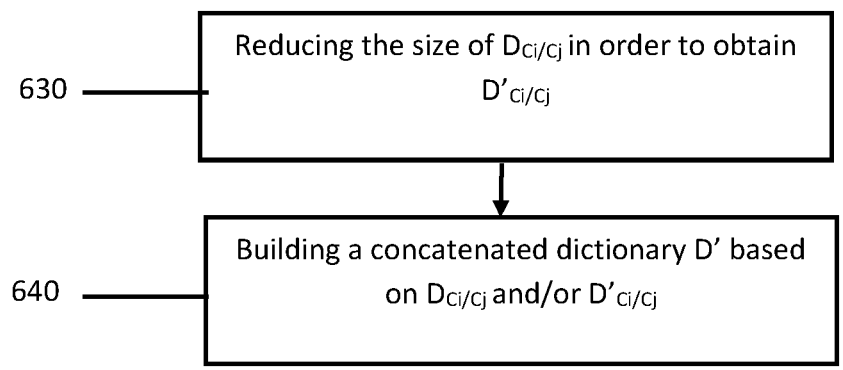
FIG. 6A illustrates other operations that can be performed in another method of building a dictionary which stores features specific to each category of malware.

As shown in FIGS. 6A and 7, according to some embodiments, the size of each of one or more of the category-specific dictionaries $D_{Ci/Cj}$ can be reduced (operation 630), in order to obtain respective category-specific dictionary $D'_{Ci/Cj}$.

This can comprise selecting only a subset of the features present in the category-specific dictionary $D_{Ci/Cj}$, in order to obtain category-specific dictionary $D'_{Ci/Cj}$.

As already explained, some of the dictionaries $D_{Ci/Cj}$ can be redundant. Therefore, according to some embodiments, the reduction is performed only on (at maximum) (N*N−1)/2 dictionaries $D_{Ci/Cj}$, to obtain (at maximum) (N*N−1)/2 dictionaries $D'_{Ci/Cj}$.

Various reduction methods will be described e.g. with reference to FIG. 11.

According to some embodiments, a dictionary D' can be built (operation 640) based on dictionaries $D'_{Ci/Cj}$.

According to some embodiments, D' can be the concatenation of at least some of dictionaries $D'_{Ci/Cj}$.

In some embodiments, D' can be the concatenation of at least some of dictionaries $D_{Ci/Cj}$ (that is to say before their reduction).

In some embodiments, if a feature is present more than once in D', this feature can be filtered to keep it only once in D'.

In some embodiments, if a given feature is redundant among all dictionaries $D_{Ci/Cj}$ (that is to say that this given feature is present in more than one dictionary $D_{Ci/Cj}$, or $D'_{Ci/Cj}$, for all i and j), then this feature can be filtered, to keep it only once in the final dictionary D'.

In some embodiments, D' is built based both on $D'_{Ci/Cj}$ and $D_{Ci/Cj}$. It can be e.g. a concatenation of some of dictionaries $D'_{Ci/Cj}$ and of some of dictionaries $D_{Ci/Cj}$.

Dictionary D' can be used, as explained hereinafter, to build a data structure (vector) representative of each malware file and suitable to be processed by the deep learning algorithm, for determining prospects of whether malware file belongs to one or more malware categories.

Figure 8:
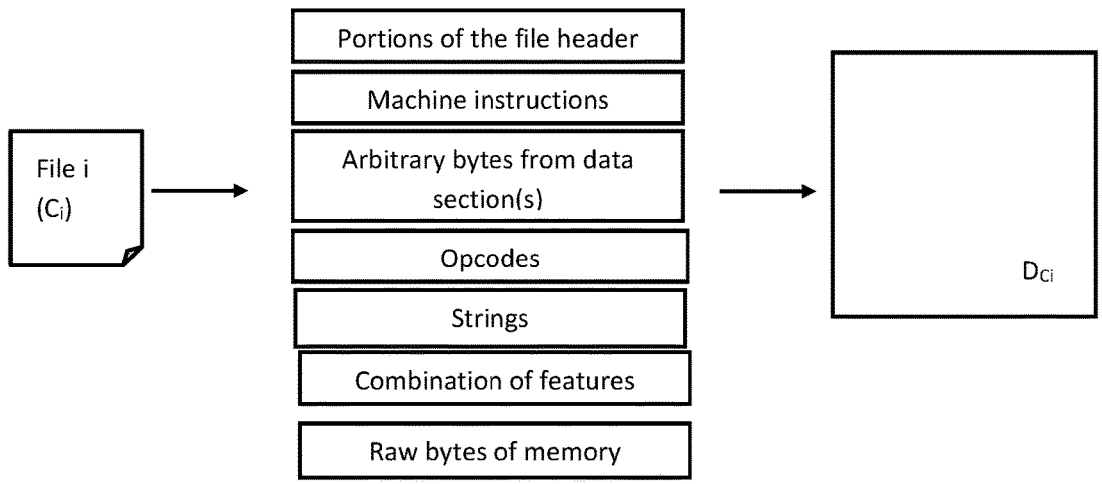
FIG. 8 illustrates embodiments of a method of extracting features from a malware file, for building a dictionary.

Attention is now drawn to FIG. 8.

As mentioned in the various embodiments above (see in particular operations 510, 610), for each category, various features are extracted from malware files of the training set belonging to this category.

According to some embodiments, this can comprise extracting from one or more portions of the binary file (e.g. .exe, etc.) of the malware file, a sequence of bytes of the binary file.

In particular, for a given category $C_i$, this can comprise extracting all possible different sequences of bytes present in one or more predetermined portions of the binary file of these malware files, and storing them into the dictionary $D_{Ci}$.

The length of the sequence of bytes can be predetermined, and/or can be determined during the process (building of the dictionary).

The portion of the binary files from which the bytes are extracted can be predetermined, and/or can be determined during the process (building of the dictionary).

These portions include e.g., one or more fields of a file (either executable or not) header, one or more machine instructions (with or without arguments) extracted from the file, arbitrary bytes from a file's data section, etc.

According to some embodiments, features can be extracted without requiring an input comprising information or data representative of the role or function of these features in the file. The dictionary can thus be built without requiring to "understand" the role of each feature. A raw extraction, irrespective of the role or function of each feature, can be performed. In other words, the dictionary $D_{Ci}$, built by extracting the different features present in the malware files of this category, can be agnostic to the actual function of these features in the files.

In some embodiments, all possible different sequences of bytes of the entire binary file of the different malware files of a given category $C_i$ are extracted and stored in the dictionary $D_{Ci}$.

According to some embodiments, each feature is extracted separately from the content of the malware files. For instance, if a malware file comprises features $F_1$ to $F_N$, features $F_1$ to $F_N$ are extracted separately and stored in the dictionary $D_{Ci}$.

In another embodiment, the features are extracted by groups of features. In this case, a first group may be [F1; F2], a second group [F3; F4], etc. The features may for instance be grouped in different groups, each group comprising "n" successive features as they appear in the files. Thus, the dictionary $D_{Ci}$ stores these different groups of "n" features.

According to some embodiments, dictionary $D_{Ci}$ is built by extracting strings present in the content of one or more of the malware files. The content of the malware files from which the strings are extracted might or might not depend on the type of the file.

Strings may be defined as any continuous sequence of textual characters, the groups being separated by a whitespace. In this case, all different strings (or at least a subset) of all malware files of a given category $C_i$ are extracted and stored in the dictionary $D_{Ci}$. If a given string is present in more than one malware file of a given category $C_i$, then it can be stored once in the dictionary $D_{Ci}$.

For instance, if strings STRG1 to STRGN are present in the set of malware files of category Ci, the dictionary $D_{Ci}$ can comprise strings STRG1 to STRGN.

As already mentioned, the strings may be extracted from the files by groups of strings.

According to some embodiments, for each category $C_i$, dictionary $D_{Ci}$ is built by extracting the different opcodes present in the content of the one or more of malware files of this category.

In computing, an opcode (abbreviated from operation code) is the portion of a machine language instruction that specifies the operation to be performed. Examples of opcodes are functions such as "jump", "add", "move", etc. These opcodes may be found in the assembler code of the file, which is a low level of programming.

The opcodes may be extracted each individually or as groups of opcodes.

If a opcode is present in one or more of the malware files of a given category $C_i$, then it can be stored once in the dictionary $D_{Ci}$.

According to some embodiments, the features comprise features present in the header, and/or statistical features characterizing the file. The statistical features may be values that may be read from the file itself (not necessarily in the header) or values that need to be computed from the file.

Examples of statistical features include: "File size", "Entropy" (information on the file's "disorganization"), "Number of sections" (number of structural parts in the file) Many other different statistical features may be used.

According to some embodiments, dictionary Dc, can be built by extracting arbitrary byte values present in the content of one or more of malware files. The content of the malware files from which the bytes are extracted might or might not depend on the type of the file. According to some embodiments, a combination of one or more of the features described above can be extracted from the malware files, such as:

operating codes of the malware files, or strings present in the content of the malware files, or parts of a header of the malware files, or strings present in the content of the malware files and operating codes of the malware files, or strings present in the content of the malware files and parts of a header of the malware files, or parts of a header of the malware files, and operating codes of the malware files, or raw bytes of memory.

Figure 8A:
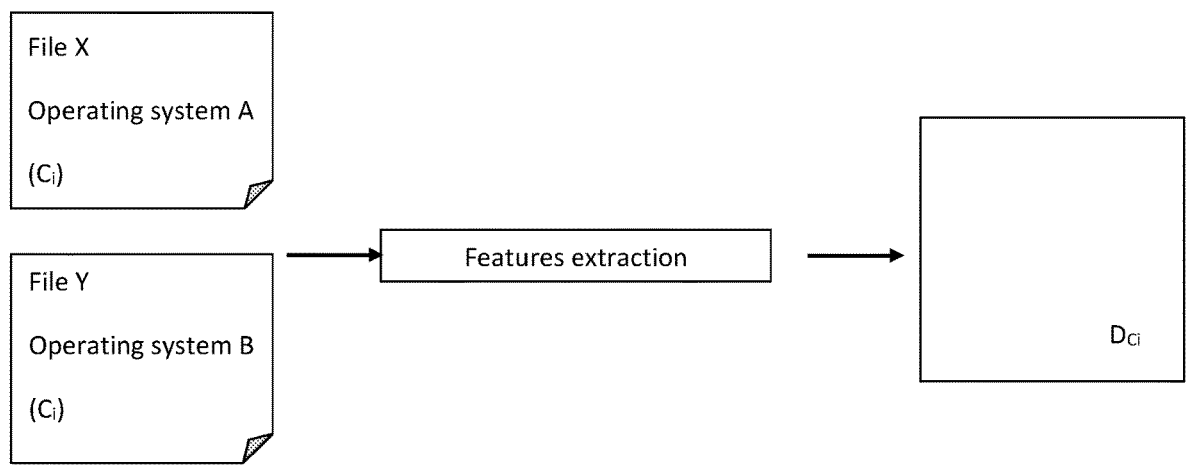
FIG. 8A illustrates an embodiment in which features are extracted from a malware file operating on different operating systems, wherein these features are independent of the operating systems.

According to some embodiments, the malware files of the training set are operable on different operating systems (see FIG. 8A). For instance, some files are operable on a Windows™ operating system, whereas some files are operable on an Apple™ operating system. This applies to other operating systems and to a greater number of operating systems.

By selecting features that are independent from the operating systems, each dictionary $D_{Ci}$ (and the other dictionaries which depend on this dictionary) can be built, irrespective of the operating systems.

In other words, the dictionaries may be built although the files come from different sources and behave in different ways due to their different operating systems. This provides a high flexibility for building the dictionaries. For instance, the features "strings" are independent of the operating system. The same applies to the "opcodes" feature.

According to some embodiments, the malware files of the training set are operable using different compilers (this embodiment is not represented). By selecting features that are independent from the compilers, each dictionary $D_{Ci}$ (and the other dictionaries which depend on this dictionary) can be built, irrespective of the operating systems.

According to some embodiments, the malware files of the training set can be from various types (e.g., executable or non-executable files) since, according to some embodiments, the features are extracted from the files without regarding the file type, specific magic words, etc. Therefore, each dictionary $D_{Ci}$ (and the other dictionaries which depend on this dictionary) can be built, irrespective of the type of the malware files.

Figures 9, 10:
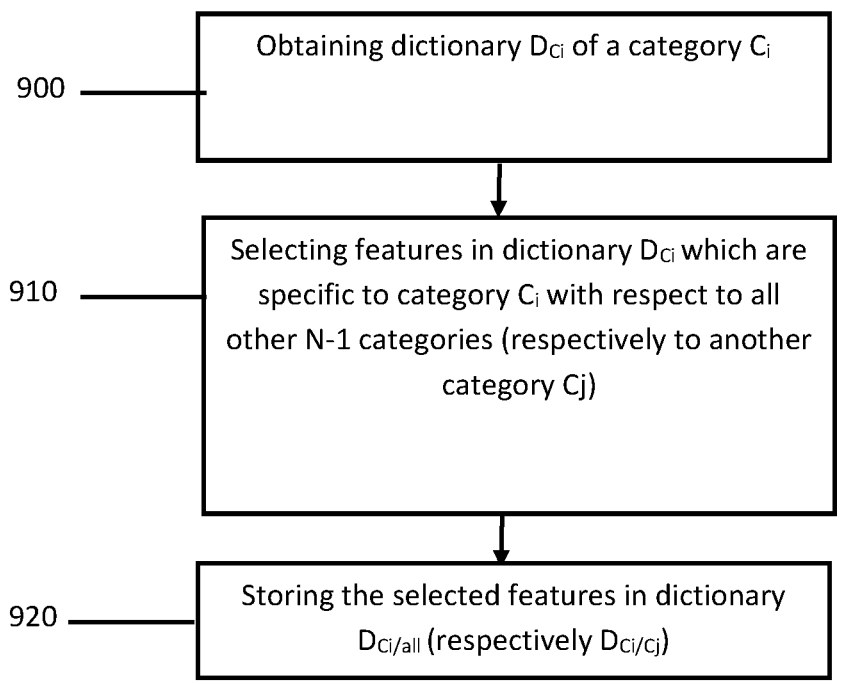
FIG. 9 illustrates an embodiment of operations that can be performed to select features specific to a malware category.
FIG. 10 illustrates a non-limitative example of the method of FIG. 9.

Attention is now drawn to FIG. 9.

As mentioned above, a dictionary $D_{Ci}$ can be obtained for a category Ci (operation 900, based e.g. on operations 510/610).

As mentioned above (see operations 520/620), features specific to a category Ci can be determined (operation 910 in FIG. 9), and stored in a category-specific dictionary $D_{Ci}$ (operation 920 in FIG. 9).

In particular, in operation 520 above, features specific to a category $C_i$ with respect to all other N−1 categories can be determined, according to at least one first specificity criteria, and stored in $D_{Ci/all}$.

Similarly, in operation 560 above, features specific to a category $C_i$ with respect to another category Cj (for j from 1 to N and j different from i) can be separately determined, according to at least one first specificity criteria and stored in $D_{Ci/Cj}$.

According to some embodiments, these specific features can be determined using a statistical method. This statistical method can be tuned such that:

in operation 520, if statistical data indicate that a feature X is more present in category $C_i$ than in all other N−1 categories, according to a first specificity criteria, then feature X can be selected to be included in category-specific dictionary $D_{Ci/all}$. For example, if the difference between the frequency of occurrence of feature X in category Ci and the frequency of occurrence of feature X in all other N−1 categories is above a threshold (which thus defines the first specificity criteria), then feature X can be selected to be included in category-specific dictionary $D_{Ci/all}$. This is however not limitative.

in operation 560, if statistical data indicate that a feature Y is more present in category $C_i$ than in another category $C_j$, according to a first specificity criteria, then feature Y can be selected to be included in category-specific dictionary $D_{Ci/Cj}$. For example, if the difference between the frequency of occurrence of feature Y in category $C_i$ and the frequency of occurrence of feature Y in another category $C_j$ is above a threshold (which thus defines the first specificity criteria), then feature Y can be selected to be included in category-specific dictionary $D_{Ci/Cj}$. This is however not limitative.

Non limitative examples of a statistical method can include chi-squared test correlation based algorithms, TF-IDF (Term Frequency-Inverse Document Frequency) algorithms, Information gain, Gini criteria, etc.

According to some embodiments, a machine linear algorithm is used. Non limitative examples include logistic regression, linear SVM ("Support Vector Machine"), etc.

According to some embodiments, one or more neural networks can be used to perform this selection of specific features.

According to some embodiments, a non-linear machine or deep learning algorithm can be used, such as unsupervised neural networks, neural networks with non-linear activation function, SVM with non-linear kernel, Denoising Autoencoders and Restricted Boltzmann Machines. These methods are used for "representation learning", i.e., construction of high level non-linear features.

Denoising Autoencoders are for instance described in "*Stacked Denoising Autoencoders: Learning Useful Representations in a Deep Network with a Local Denoising Criterion*". Vincent P. et al., Journal of Machine Learning Research 11 (2010) 3371-340, which is herein incorporated by reference.

Restricted Boltzmann Machine is described e.g. in Larochelle, H., Bengio, Y. (2008), "*Classification using discriminative restricted Boltzmann machines*" Proceedings of the 25th international conference on Machine learning, ICML '08, p. 536, Hinton, G. E., Osindero, S. & Teh, Y.-W, A fast learning algorithm for deep belief nets, Neural Computation 18, 1527-1554 (2006), and Wikipedia, https://en.wikipedia.org/wiki/Restricted_Boltzmann_machine. These documents are herein incorporated by reference.

According to some embodiments, a plurality of classification algorithms, such as the one described above, can be applied successively to select the features to be stored in $D_{Ci/all}$ or $D_{Ci/Cj}$.

It was mentioned above that according to some embodiments, not only features $F_{Ci/all}$ specific to a category Ci with respect to all other N−1 categories can be determined and stored in $D_{Ci/all}$, but also features $F_{all/Ci}$ specifically present in malware of all other N−1 categories $C_j$ with respect to malware of category Ci (with j different from i).

$F_{all/Ci}$ can be determined using the same methods (see above various possible embodiments) described for determining features $F_{Ci/all}$.

It was mentioned above that according to some embodiments, not only features $F_{Ci/Cj}$ specific to a category Ci with respect to another category $C_j$ can be determined and stored in $D_{Ci/Cj}$, but also features $F_{Cj/Ci}$ specifically present in malware of this other category $C_j$ with respect to malware of category Ci.

$F_{Cj/Ci}$ can be determined using the same methods (see above various possible embodiments) described for determining features $F_{Ci/Cj}$.

A non-limitative numerical example is provided in FIG. 10.

Assume three categories of malware are present in the training set: "Trojan" (category $C_1$), "Ransomware" (category $C_2$) and "Keylogger" (category $C_3$).

For category "Trojan", features A, B and C were extracted from the malware files of the training set (which belongs to this category) and a corresponding level of occurrence 1000 was computed. It has to be noted that the numbers depicted in FIG. 10 are purely illustrative.

Dictionary $D_{C1}$ stores features A, B and C.

Features $F_{C1/all}$ specific to category C, with respect to categories $C_2$ and $C_3$ can be selected (depending on the first specificity criteria) e.g. as features A and C.

Features $F_{all/C1}$ specific to all other categories $C_2$ and $C_3$ with respect to category $C_1$ can be selected (depending on the second specificity criteria) e.g. as feature D. Indeed, D is never present in category $C_1$, but is present in $C_2$ and $C_3$. Therefore, A, C and D can be stored in dictionary $D_{C1/all}$.

Attention is now drawn to FIG. 11.

As mentioned above, the size of dictionary $D_{Ci/all}$ can be reduced (operation 530), in order to obtain $D'_{Ci/all}$. Similarly, the size of dictionary $D_{Ci/Cj}$ can be reduced (operation 630), in order to obtain $D'_{Ci/Cj}$. It has to be noted that according to some embodiments, this reduction is not performed, or performed only on part of the dictionaries, and the concatenated dictionary D or D' is built based on these dictionaries, even if they were not reduced.

According to some embodiments, reduction methods such as linear methods, (statistical methods, e.g. SVM) and/or non-linear methods (neural network), etc. can be used.

According to some embodiments, this reduction can comprise identifying, among features present in the category-specific dictionary $D_{Ci/all}$ of a category $C_i$, one or more combinations of features $F'_{Ci/all}$ which are specific to malware files of this category $C_i$ with respect to all other N−1 categories $C_j$, according to at least one third specificity criteria, wherein j is different from i.

The third specificity criteria can be e.g. a threshold. If a combination of features (comprising e.g. at least two features, or more) is more present in this category $C_i$, with respect to all other N−1 categories (the difference can be assessed with respect to the third specificity criteria), then this combination of features can be selected and the corresponding features can be stored in reduced dictionary $D'_{Ci/all}$.

In other words, instead of analyzing the presence of each feature separately which is representative of this category $C_i$, the method can comprise analyzing the presence of combinations of features which are representative of this category $C_i$. For example, assume that features A, B, C, and D are stored in dictionary $D_{Ci/all}$. A method can be applied to determine that the presence of A and B together, is more representative of category $C_i$ than other combinations of features (such as A and C, or A and D). As a consequence, only A and B will be stored in $D'_{Ci/all}$.

A combination of more than two features can be tested in order to determine a subset of the features which are to be selected and stored in $D'_{Ci/all}$.

Similarly, according to some embodiments, this reduction can comprise identifying one or more combinations of features $F'_{all/Ci}$ which are specific to malware files of the other N-1 categories $C_j$ (viewed as a consolidated group) with respect to current category $C_i$, according to at least one fourth specificity criteria, wherein j is different from i.

The fourth specificity criteria can be e.g. a threshold. If a combination of features (comprising e.g. at least two features, or more) is more present in all other N-1 categories $C_j$, with respect to current category $C_i$ (the difference can be assessed with respect to the fourth specificity criteria), then this combination of features can be selected and the corresponding features can be stored in reduced dictionary $D'_{Ci/all}$.

It is not necessary to store information which represents the fact that the combination of these features is relevant, since the machine learning algorithm will learn this information by itself; during the training phase described hereinafter.

The same methods can be used to reduce dictionary $D_{Ci/Cj}$ into dictionary $D'_{Ci/Cj}$. In other words, this reduction can comprise identifying one or more combinations of features $F'_{Ci/Cj}$ which are specific to malware files of category Ci with respect to another category $C_j$, according to at least one fourth specificity criteria, wherein j is different from i.

As mentioned, the fourth specificity criteria can be e.g. a threshold. If a combination of features (comprising e.g. at least two features, or more) is more present in all of category $C_i$, with respect to another category $C_j$ (the difference can be assessed with respect to the fourth specificity criteria), then this combination of features can be selected and the corresponding features can be stored in reduced dictionary $D'_{Ci/Cj}$.

This reduction can also comprise identifying one or more combinations of features $F'_{Cj/Ci}$ which are specific to malware files of another category Cj with respect to current $C_i$, according to at least one fourth specificity criteria, wherein j is different from i.

A non-limitative example is provided in FIG. 12. The level of occurrence of various combinations of features is tested, and it appears that for category $C_i$, the combination of features {A, C} is never present in this category, but is present in other categories $C_2$ and $C_3$ with a frequency above a threshold (fourth specificity criteria). Therefore, A and C can be stored in dictionary $D'_{C1/all}$ (as already mentioned, the repetitive absence of a feature, or of a combination of features in a given category, with respect to all other categories, is also representative of this given category).

Examples of a method for determining the features to be stored in $D'_{Ci/all}$ (or $D'_{Ci/Cj}$) can include SVM ("Support Vector Machine"), logistic regression, etc. but this is not limitative.

According to some embodiments, SVM can comprise creating a model whose formula is $w_A X_A + w_B X_B + w_C X_C = 0$ ($X_A = 1$ if feature A exists in the malware file, or $X_A = 0$ otherwise, $X_B = 1$ if feature B exists in the malware file, or $X_B = 0$ otherwise, $X_C = 1$ if feature C exists in the malware file, or $X_C = 0$ otherwise). The method can comprise selecting the two highest weights among weights $w_A$, $w_A$ and $w_C$. The two highest weights are indicative of the top two linearly correlated features in the group of A, B, C.

If $w_B$ is the minimal, then features A and C can be selected and stored in $D'_{Ci/all}$ (or $D'_{Ci/Cj}$).

In the embodiments of FIGS. 4A and 7, single features specific to a category can be selected (thereby providing $D_{Ci/all}$, or $D_{Ci/Cj}$), and then a combination of features can be selected among these features (thereby providing $D'_{Ci/all}$, or $D'_{Ci/Cj}$).

According to some embodiments, features present in $D_{Ci}$ are immediately processed to identify the relevant combination of features (without first determining features) which are specific to category $C_i$ with respect to all other N-1 categories (or respectively to category $C_i$ with respect to another category $C_j$), using the methods described with respect to FIG. 9. (e.g. SVM, logistic regression, etc.). In this case, the dictionary $D_{Ci/all}$ or $D_{Ci/Cj}$ is not built (this operation is skipped), but rather a dictionary such as $D''_{Ci/all}$ or $D''_{Ci/Cj}$ is built immediately.

Figure 12A:
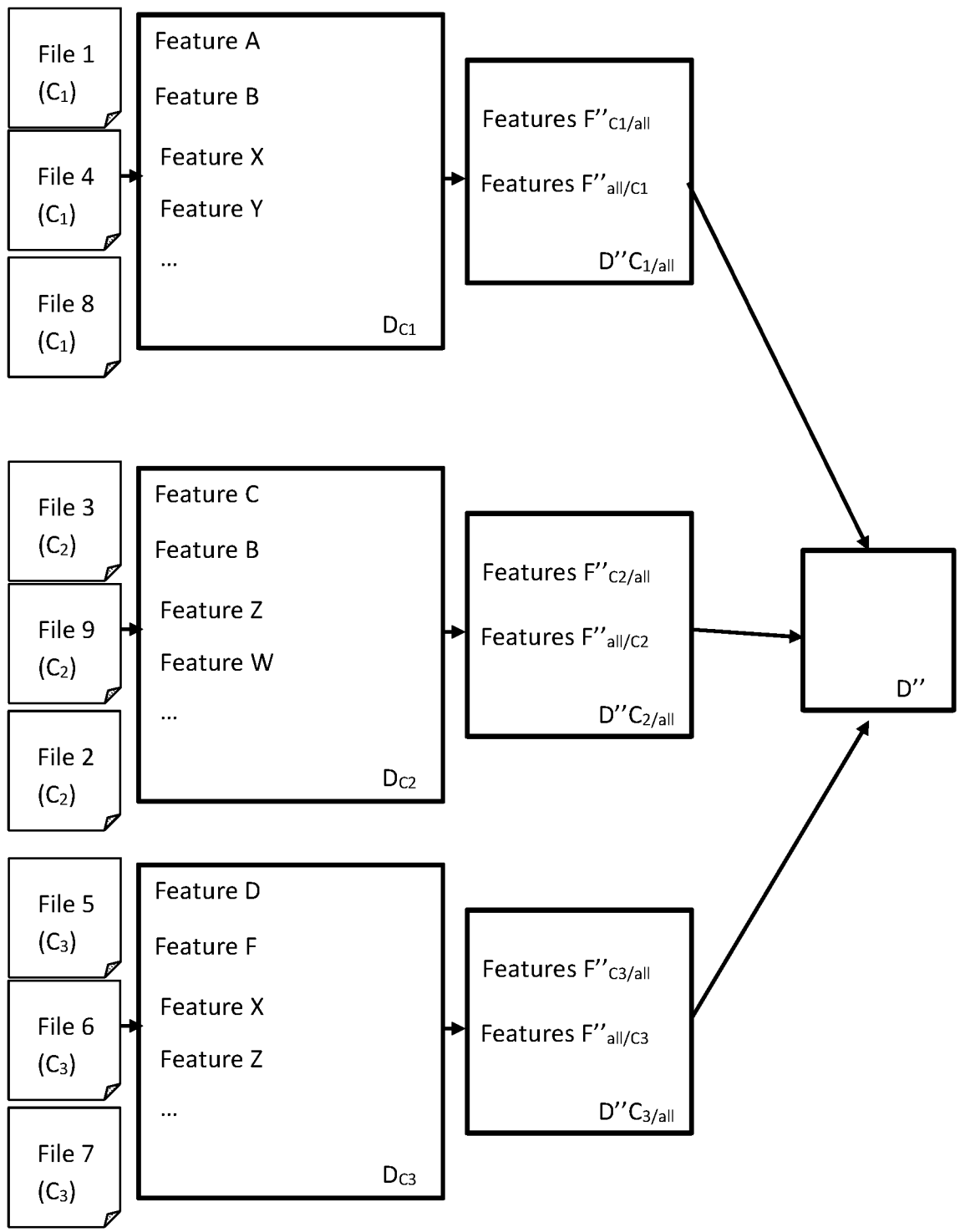
FIG. 12A illustrates a variant of the method described in FIGS. 4A, 5 and 5A.

A non-limitative example is provided in FIG. 12A. As shown, dictionary $D_{Ci}$ can be reduced into dictionary $D''_{Ci/all}$ which can store at least one of:

- features $F''_{Ci/all}$ (corresponding to a combination of features which are specific to category $C_i$ with respect to all other N-1 categories). These features can be obtained e.g. using one or more of the various methods described above to reduce $D_{Ci/all}$ to $D'_{Ci/all}$ (however, in this embodiment, it is now $D_{Ci}$ which is reduced to $D''_{Ci/all}$);
- features $F''_{all/Ci}$ (corresponding to a combination of features which are specific to all other N-1 categories $C_j$ with respect to $C_i$). These features can be obtained e.g. using one or more of the various methods described above to reduce $D_{Ci/all}$ to $D'_{Ci/all}$ (however, in this embodiment, it is now $D_{Ci}$ which is reduced to $D''_{Ci/all}$);

A concatenated dictionary $D''$ can be built e.g. by concatenating $D''_{Ci/all}$.

Figure 12B:
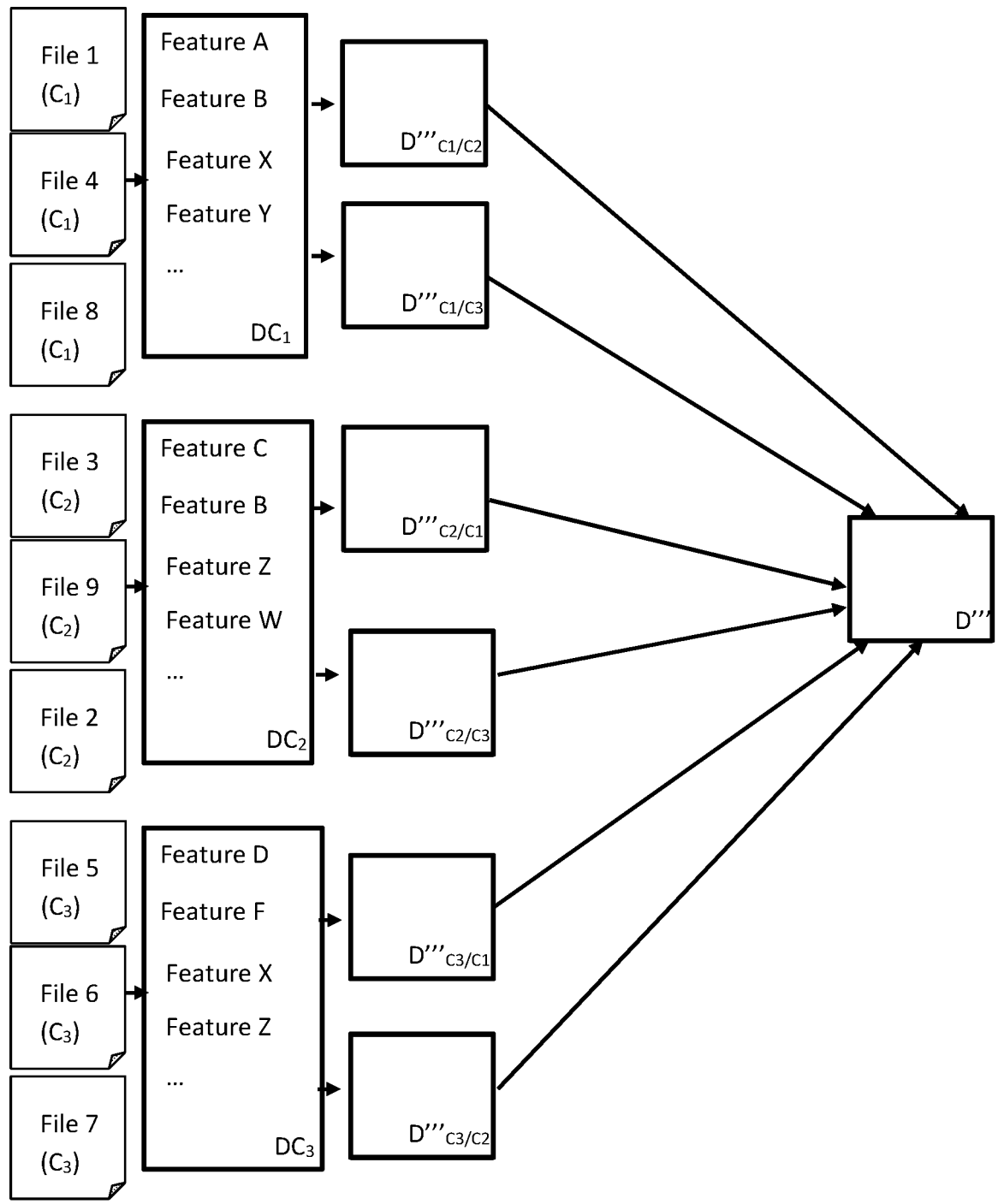
FIG. 12B illustrates a variant of the method described in FIGS. 6, 6A and 7.

Another non-limitative example is provided in FIG. 12B. As shown, dictionary $D_{Ci/Cj}$ can be reduced into dictionary $D''_{Ci/Cj}$ which can store at least one of:

- features $F'''_{Ci/Cj}$ (corresponding to a combination of features which are specific to category $C_i$ with respect to another category $C_j$). These features can be obtained e.g. using one or more of the various methods described above to reduce $D_{Ci/Cj}$ to $D'_{Ci/Cj}$ (however, in this embodiment, it is now $D_{Ci}$ which is reduced to $D'''_{Ci/Cj}$);
- features $F'''_{Cj/Ci}$ (corresponding to a combination of features which are specific to another category $C_j$ with respect to current category $C_i$). These features can be obtained e.g. using one or more of the various methods described above to reduce $D_{Ci/Cj}$ to $D'_{Ci/Cj}$ (however, in this embodiment, it is now $D_{Ci}$ which is reduced to $D'''_{Ci/Cj}$);

A concatenated dictionary $D'''$ can be built e.g. by concatenating one or more of $D''_{Ci/Cj}$. If necessary, a filtering of the redundant features can be performed.

In practice $D''_{Ci/all}$ (respectively $D''_{Ci/Cj}$) might differ from dictionary $D'_{Ci/all}$ (respectively $D'_{Ci/Cj}$) obtained based on the reduction of $D_{Ci/all}$ (respectively $D_{Ci/Cj}$).

Figure 13A:
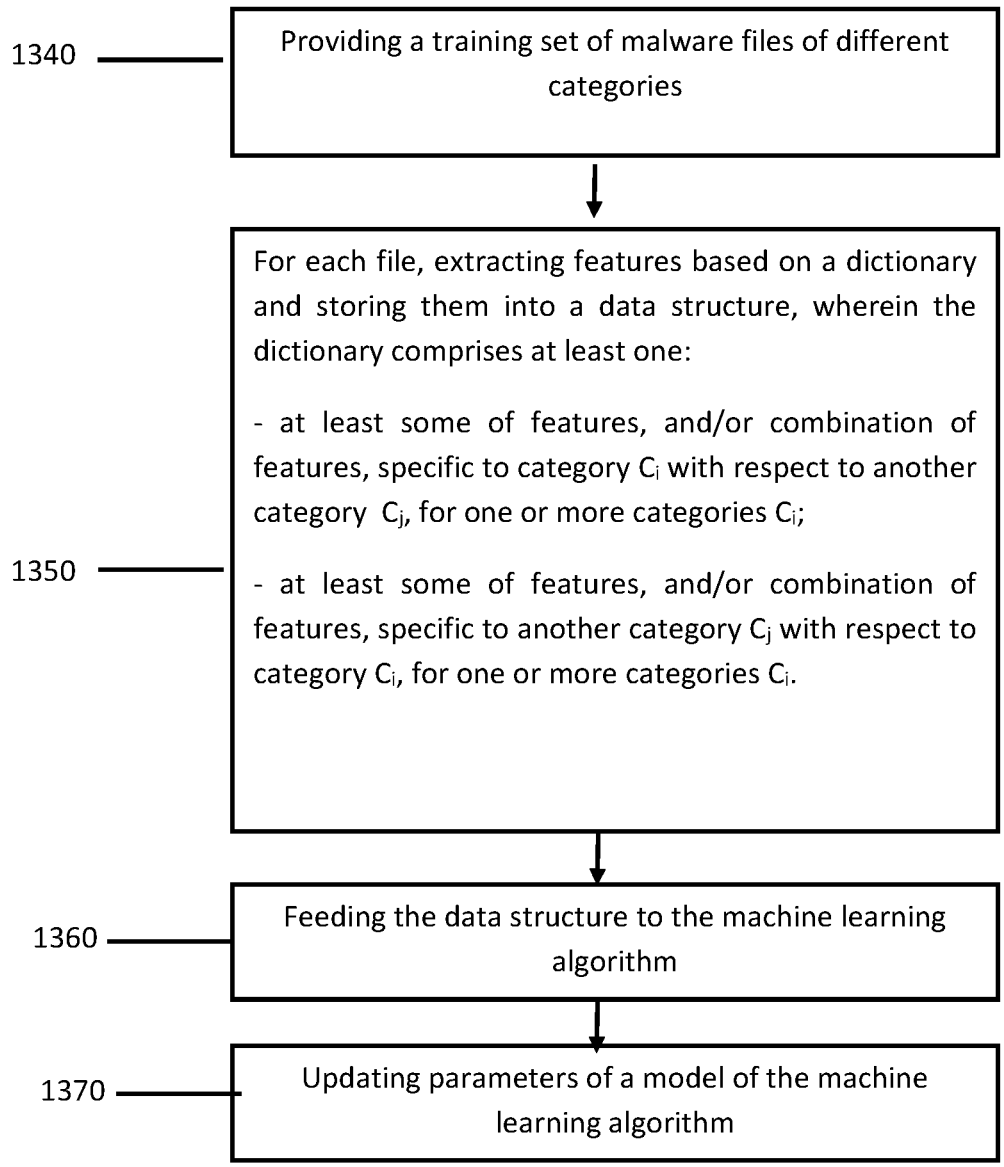
FIG. 13A illustrates an embodiment of a method of training a machine learning algorithm of a malware determination system.

Attention is now drawn to FIGS. 13 and 13A, which describes a method of training a malware determination system comprising a machine learning algorithm, such as a deep learning algorithm. In particular, this training attempts to set and/or improve one or more parameters of one or more models of the machine learning algorithm, in order to improve the ability of the model to detect the category of each malware file.

The method can comprise providing (operation 1300 or operation 1340) a training set comprising a plurality of malware files, wherein these malware files belong to different categories of malware files (at least two different categories, or more, can be used).

Examples of categories of malware have been provided above.

Operation 1300 (respectively operation 1340) is similar to operations 500 and 600 described above. However, the training set used in operation 1300 (respectively operation 1340) is not necessarily the same as the one used for building the dictionary (that is to say operation 500 or 600), and a different training set can be used in the training phase than in the building of the one or more dictionaries.

The method can comprise, for each of a plurality of files of the training set, building a data structure (operation 1310 or operation 1350) representative of features present in this file, based on features present in at least one dictionary. The data structure can be e.g. a vector or a matrix. According to some embodiments, the dictionary stores at least, for each category $C_i$ out of a plurality of N categories of malware files, with i from 1 to N and N>2, at least some of features $F_{Ci/all}$ which are specific to said category $C_i$ with respect to all other N−1 categories $C_j$, with j different from i, according to at least one first specificity criteria (see operation 1320). For example, the first specificity criteria can be defined as a threshold, and at least some of the features for which the difference between the level of occurrence in category $C_i$, with respect to all other N−1 categories $C_j$ is above the threshold can be stored in $F_{Ci/all}$. This is not limitative and other criteria can be used, depending on the method used to identify specific features (for example in the SVM method, a criteria can be to select the features for which the associated weights in the SVM model is the highest, etc.).

According to some embodiments, the dictionary can store at least some of features $F_{all/Ci}$ which can comprise features specific to malware files of all N−1 categories Cj with respect to features of malware files of category $C_i$, according to a specificity criteria, wherein i is different from j. For example, the specificity criteria can be defined as a threshold, and at least some of the features for which the difference between the level of occurrence in all other N−1 categories $C_j$ with respect to category $C_i$ is above the threshold can be stored in $F_{all/Ci}$. This is not limitative and other criteria can be used, depending on the method used to identify specific features.

According to some embodiments, the dictionary can store for each category $C_i$ out of a plurality of N categories of malware files, with i from 1 to N and N>2, at least some of the combinations of features which are specific to said category $C_i$ with respect to all other N−1 categories $C_j$, with j different from i, according to at least one specificity criteria (such as features stored in $D'_{Ci/all}$ or $D''_{Ci/all}$). For example, the specificity criteria can be defined as a threshold, and at least some of the combinations of features for which the difference between the level of occurrence in category $C_i$, with respect to all other N−1 categories $C_j$ is above the threshold, can be stored in the dictionary. This is not limitative and other criteria can be used, depending on the method used to identify specific features.

According to some embodiments, the dictionary can store for each category $C_i$ out of a plurality of N categories of malware files, with i from 1 to N and N>2, at least some of combinations of features which are specific to all other N−1 categories $C_j$ with respect to category $C_i$, with j different from i, according to at least one specificity criteria (for example this can correspond to features stored in $D'_{Ci/all}$ or $D''_{Ci/all}$). For example, the specificity criteria can be defined as a threshold, and at least some of the combinations of features for which the difference between the level of occurrence in all other N−1 categories $C_j$, with respect to category $C_i$ is above the threshold, can be stored in the dictionary. This is not limitative, and other criteria can be used, depending on the method used to identify specific features.

According to some embodiments, features present in this dictionary can be e.g. obtained using the method described in FIGS. 4 and 5 (see dictionary D in FIG. 4A, or dictionary D'' in FIG. 12A).

According to some embodiments (see operation 1350), the dictionary stores at least, for each category $C_i$ out of a plurality of N categories of malware files, with i from 1 to N and N>1, at least some of features $F_{Ci/Cj}$ which are specific to said category $C_i$ with respect to another category Cj, for all j from 1 to N which is different from i, according to at least one first specificity criteria (see e.g. features stored in dictionary $D_{Ci/Cj}$ in FIG. 7)

According to some embodiments, the dictionary can store, for each of one or more of the categories Ci, at least some of features $F_{Cj/Ci}$. Features $F_{Cj/Ci}$ are specific to malware files of category Cj with respect to features of malware files of category Ci, according to at least one second specificity criteria, for all j from 1 to N which is different from i (see e.g. features stored in dictionary $D_{Ci/Cj}$ in FIG. 7)

According to some embodiments, the dictionary stores, for each category $C_i$ out of a plurality of N categories of malware files, with i from 1 to N and N>1, at least some of the combinations of features which are specific to said category $C_i$ with respect to another category $C_j$, for all j from 1 to N which is different from i, according to at least one specificity criteria (see e.g. features stored in dictionary $D'_{Ci/Cj}$ in FIG. 7 or features stored in $D'''_{Ci/Cj}$ in FIG. 12B).

According to some embodiments, the dictionary stores, for each category $C_i$ out of a plurality of N categories of malware files, with i from 1 to N and N>1, at least some of the combinations of features which are specific to another category $C_j$ with respect to another category $C_i$, for all j from 1 to N which is different from i, according to at least one specificity criteria (see e.g. features stored in dictionary $D'_{Ci/Cj}$ in FIG. 7 or features stored in $D'''_{Ci/Cj}$ in FIG. 12B).

According to some embodiments, features present in this dictionary can be e.g. obtained using the method described in FIGS. 6 and 7 (see dictionary D' in FIG. 7, or dictionary D''' in FIG. 12B).

According to some embodiments, if a feature stored in the dictionary is present in the file, the data structure can store data representative of this information (such as a "1" if the feature is present).

According to some embodiments, if a feature stored in the dictionary is present in the file, the data structure can store the value of this feature for this file. For example, assume the feature is the entropy of the file, then the value of the entropy for this file can be stored in the data structure.

If a feature stored in the dictionary is not present in the file, the data structure can store data representative of this information (such as a "0" if the feature is present—this is however not limitative).

Various examples of features have been provided above, such as opcodes, strings, portions of the binary file, etc. Depending on the type of feature, the method can comprise reading the relevant portion of the file (e.g. binary file, etc.)

and detecting if this feature is present at this portion. If necessary, values of the feature can be extracted.

According to some embodiments, the file can be converted into a first data structure using a first dictionary and into a second data structure using a second dictionary different from this first dictionary. For example, the first dictionary can be dictionary D or D", and the second dictionary can be dictionary D' or D'''. This is however not limitative.

According to some embodiments, the data structure can be labelled with a label representative of the real category to which the malware belongs. For example, assume a given malware file of the training set is known to be a Trojan. The corresponding data structure can be labelled with a label which represents this information, which can be used later on in the training phase, as explained hereinafter.

The method can further comprise (operation 1320 or operation 1360) feeding the data structure to the machine learning algorithm of the malware determination system.

The machine learning algorithm comprises a model (also called prediction model) which provides prospects that the malware belongs to one or more categories $C_i$ of malware.

The prospects can comprise, depending on the embodiments, probabilities that the malware belongs to one or more of categories $C_i$. For example, a probability can be associated to each category. For example, a result for a given file could be "80%" for Trojan, and "20%" for Ransomware. These numbers are non-limiting numbers.

According to some embodiments, the prospects may be converted into a binary result, that is to say a single category to which the malware is assumed to belong to. Various methods can be used, such as selecting the highest probability.

Since the real category (or categories) of the malware is generally known, a comparison between the prospects provided by the machine learning algorithm, and the real category of the malware, can be used to update parameters of the model, and therefore improve the ability of the machine learning algorithm to correctly identify categories of the malware files (see operation 1330, 1370).

The parameters can be e.g. weights of the model.

According to some embodiments, the machine learning algorithm is a linear machine learning algorithm (for example SVM, and the training method can include e.g. sub-gradient descent or coordinate descent)

According to some embodiments, the machine learning algorithm is a deep learning algorithm.

The update of the parameters of the model can rely on known techniques, which have been described in the literature, such as the known per se method of "Backpropagation". This method is for instance described in Werbos, P., Beyond Regression: New Tools for Prediction and Analysis in the Behavioral Sciences, PhD thesis, Harvard Univ. (1974), Parker, D. B. Learning Logic Report TR-47 (MIT Press, 1985), Rumelhart, D. E., Hinton, G. E. & Williams, R. J., Learning representations by back-propagating errors, Nature 323, 533-536 (1986), and in the webpage of Wikipedia: https://en.wikipedia.org/wiki/Backpropagation. These documents are all herein incorporated by reference. Another method includes the known per se "Contrastive Divergence" method, which is for instance described in Hinton, G. E., Osindero, S. & Teh, Y.-W., A fast learning algorithm for deep belief nets, Neural Computation 18, 1527-1554 (2006). This document is herein incorporated by reference.

According to some embodiments, a supervised training is performed, since the category of the malware files fed at the input is known.

According to some embodiments, the dictionary used to convert the files into a data structure to be fed to the machine learning algorithm dictates the size and the content of each data structure, so that the machine learning algorithm can process them for updating its prediction model. Despite the vast amount of data that are to be fed to the deep learning algorithm for its training, this conversion of the file allows the machine learning to process the input data.

According to some embodiments, for each file, a real time processing is performed by the machine learning algorithm for predicting to which malware category this file belongs.

According to some embodiments, and as mentioned above, the dictionary can store features which are independent of the operating system of the malware files. Therefore, according to some embodiments, the training set can be chosen to comprise malware files which operate on different operating systems. A data structure can be created for each file using the same dictionary, and fed to the machine learning algorithm for its training. As a consequence, the same model can be trained to determine the category of the malware even if such malware operates on different operating systems, thereby providing a robust and flexible model.

According to some embodiments, and as mentioned above, the dictionary can store features which are independent of the compiler of the malware files. Therefore, according to some embodiments, the training set can be chosen to comprise malware files which are compiled using different compilers. A data structure can be created for each file using the same dictionary, and fed to the machine learning algorithm for its training. As a consequence, the same model can be trained to determine the category of the malware even if such malware is compiled using different compilers, thereby providing a robust and flexible model.

According to some embodiments, and as mentioned above, the dictionary can store features which are independent of the type (executable, non-executable) of the malware files. Therefore, according to some embodiments, the training set can be chosen to comprise malware files of different types (executable, non-executable). A data structure can be created for each file using the same dictionary, and fed to the machine learning algorithm for its training. As a consequence, the same model can be trained to determine the category of the malware even the malware are of different types, thereby providing a robust and flexible model.

Figure 14:
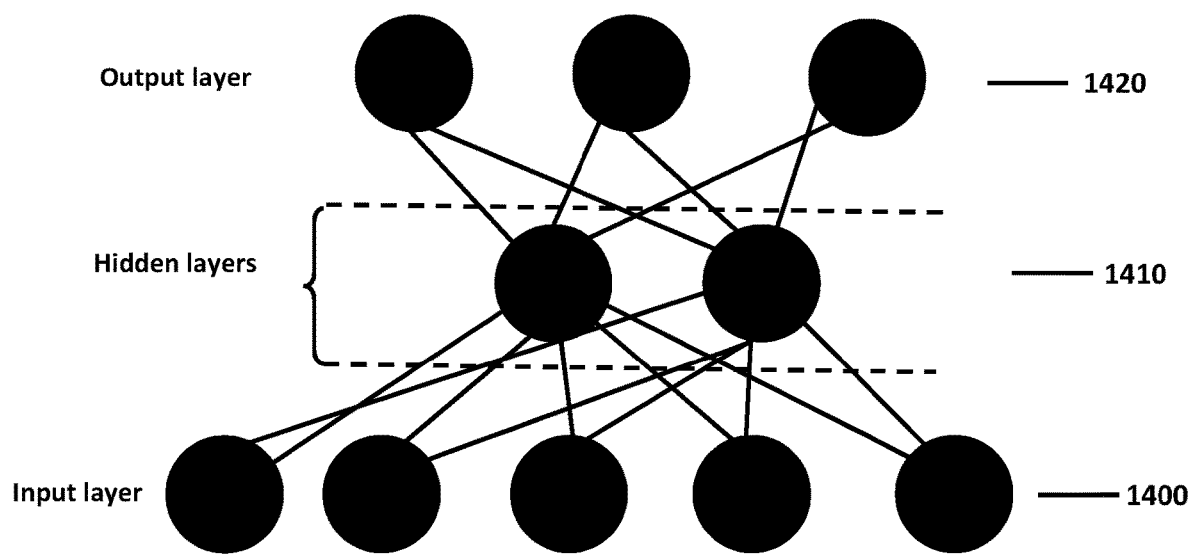
FIG. 14 illustrates an embodiment of a structure of a deep learning algorithm that can be stored in a malware determination system.

Attention is now drawn to FIG. 14.

According to some embodiments, the deep learning algorithm can comprise an input layer 1400, a plurality of hidden layers 1410 and an output layer 1420. In particular, the output layer 1420 can comprise N neurons, representative of the N different possible categories of malware that the deep learning algorithm can identify. In particular, N can correspond to the maximal number of different categories of malware that the deep learning algorithm can identify.

According to some embodiments, the input layer 1400 can comprise a number of neurons which is equal to the number of features stored in the dictionary.

According to some embodiments, assume a machine learning algorithm is configured to identify (at maximum) N different categories of malware.

Assume the dictionary which is used to convert files which are fed to the machine learning algorithm for its training comprises features specific to a plurality of categories $C_i$, with i from 1 to N'. Various methods were described above to determine these specific features.

According to some embodiments, N'=N. In other words, the malware categories that were used to build the features of the dictionary are the same as the malware categories that the machine learning algorithm can detect.

According to some embodiments, N' can be different from N. In other words, there can be some differences between the malware categories that were used to build the features of the dictionary and the malware categories that the machine learning algorithm can detect. For example, N'>N or N'<N. After a period of training, the model of the machine learning algorithm can be considered as trained, and can be used to predict the category to which a malware belongs in a prediction phase, although this category is not known in advance.

According to some embodiments, the machine learning algorithm can be trained from time to time (using e.g. an updated version of the training set which reflects new malware and/or new categories of malware), and each user of the malware determination system can receive an updated version of the prediction model of the machine learning algorithm.

According to some embodiments, a new dictionary is built (using the various methods described above) based for e.g. on an updated version of the training set which reflects new malware and/or new categories of malware.

Figure 15A:
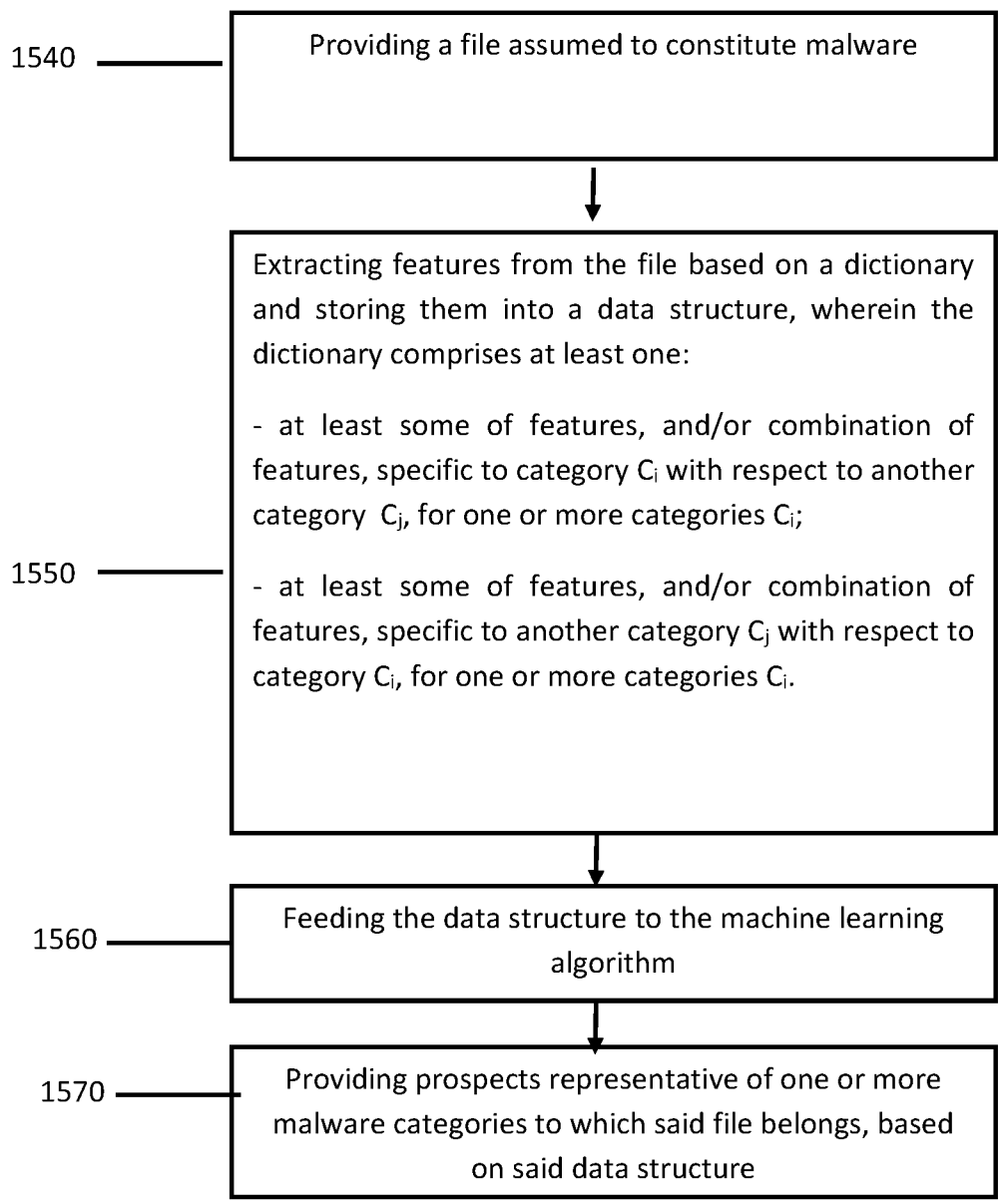
FIG. 15A illustrates another embodiment of a method of detecting a category of a malware using a machine learning algorithm of a malware determination system.

Attention is now drawn to FIGS. 15 and 15A.

The method can comprise providing (operation 1500) a file which is assumed to be malware. For example, a malware detector (see e.g. malware detector 320 in FIG. 3) can have detected that this file constitutes malware.

This file can then be transmitted to the malware determination system for determining its category. The malware determination system can store a machine learning algorithm which was trained, in particular in accordance with one of the training methods described above. The malware determination system can store one or more dictionaries (various examples of dictionaries have been provided above).

According to some embodiments, the machine algorithm has a structure in compliance with one or more of the embodiments described with respect to FIG. 14 (see e.g. size of the input layer and/or output layer, etc.).

According to some embodiments, the machine learning algorithm is a deep learning algorithm.

The method can comprise building (see operation 1510 or 1550) a data structure representative of features present in the file.

This can comprise building a data structure (operation 1510 or operation 1550) representative of features present in this file, based on features present in at least one dictionary. The data structure can be e.g. a vector or a matrix.

Operation 1510 is similar to operation 1310, and can rely on the same dictionaries described for operation 1310. Therefore, operation 1510 is not described and reference is made to operation 1310.

Operation 1550 is similar to operation 1350, and can rely on the same dictionaries described for operation 1350. Therefore, operation 1550 is not described and reference is made to operation 1350.

According to some embodiments, assume the machine learning algorithm was trained using a training set of malware files which were converted into data structure based on a given dictionary $D_1$, using one or more of the various training methods described above. According to some embodiments, the dictionary which is used during the prediction phase (e.g. in the methods of FIGS. 15 and 15A) to convert files that are to be fed to the machine learning algorithm can be e.g. the same dictionary $D_1$, or a subset of this dictionary $D_1$.

According to some embodiments, the file can be converted into a first data structure using a first dictionary and into a second data structure using a second dictionary, wherein the first dictionary is different from the second dictionary. For example, the first dictionary can be dictionary D or D", and the second dictionary can be dictionary D' or D'". This is however not limitative.

The method can further comprise (operation 1520 or operation 1560) feeding the data structure to the machine learning algorithm (e.g. deep learning algorithm) of the malware determination system.

The machine learning algorithm comprises a model (also called prediction model) which provides prospects that the malware belongs to one or more categories $C_i$ of malware.

The prospects can comprise, depending on the embodiments, probabilities that the malware belongs to one or more of categories $C_i$. For example, a probability can be associated to each category. For example, a result for a given file could be "80%" for Trojan, and "20%" for Ransomware. These numbers are non-limiting numbers. According to some embodiments, the prospects may be converted into a binary result, that is to say a single category to which the malware is assumed to belong. Various methods can be used, such as selecting the highest probability/probabilities, using a voting method, and using another neural network trained to provide a binary result based on a plurality of prospects representative of different malware categories provided by the machine learning algorithm for a given file, etc.

Figure 15B:
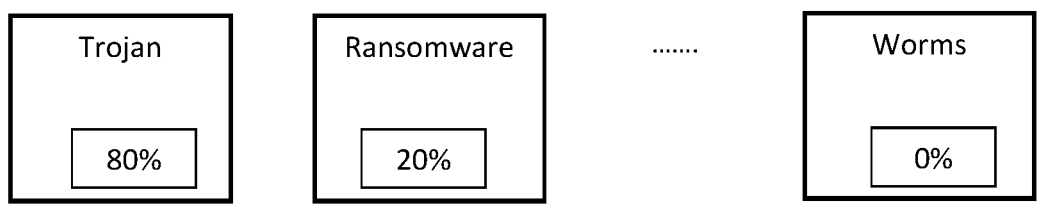
FIG. 15B illustrates an example of an output to a user.

The results computed by the malware determination system can be output, e.g. using a user interface, to a user. A non-limitative example is provided in FIG. 15B, in which it is shown that a file is considered as a Trojan with a probability of 80% and as Ransomware with a probability of 20%.

According to some embodiments, depending on the category of the malware, appropriate cure of the threat can be performed. Adequate processing specific to each category can be stored e.g. in a memory, which can be applied to the malware, in order to remove it or to neutralize it. According to some embodiments, for example, depending on the category of the malware, it can be instructed to delete the malware file, modify the malware file to prevent it from harming the user's system, store the malware file in quarantine, or take any necessary actions.

Figure 16:
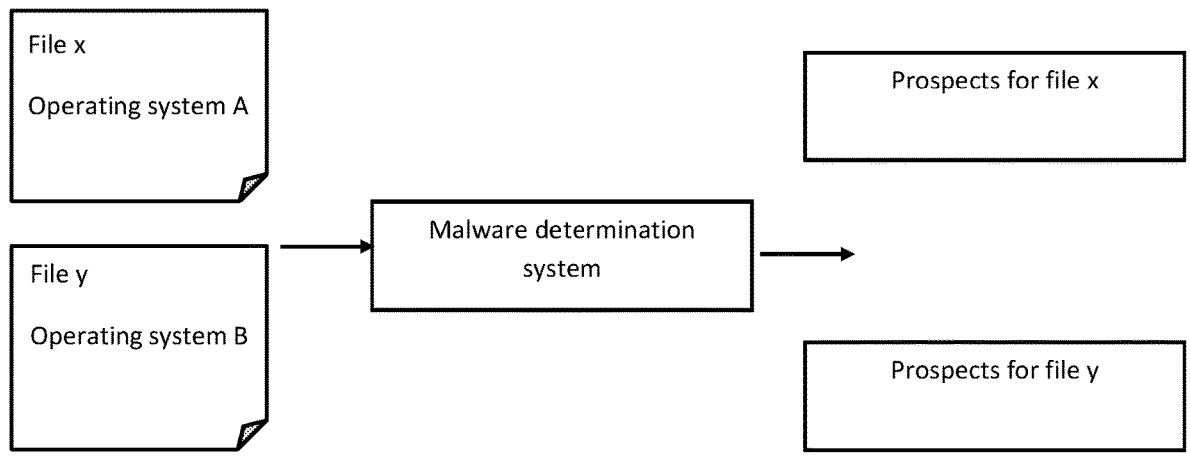
FIG. 16 illustrates an embodiment in which the same model of the malware determination system can process files operating on different operating systems, for providing prospects representative of a malware category of each file.

Attention is drawn to FIG. 16.

According to some embodiments, and as mentioned above, the dictionary can store features which are independent of the operating system of the files.

Therefore, according to some embodiments, the malware determination can be fed with various files (detected as malware), which operate on different operating systems, and can provide prospects representative of one or more malware categories to which each file belongs, irrespective of the operating system of the files.

This is shown in FIG. 16, wherein a file X (which was detected as malware) is provided, and operates on a first operating system. After conversion of the file into a data structure, using one of the dictionaries mentioned above, the malware determination system provides, using a machine learning algorithm, prospects representative of one or more malware categories to which said file belongs, based on said data structure.

Another file Y (which was detected as malware) is provided, and operates on a second operating system. After conversion of the file into a data structure, using one of the dictionaries mentioned above, the malware determination system provides, using a machine learning algorithm, prospects representative of one or more malware categories to which said file belongs, based on said data structure.

The same model of the machine learning algorithm can process both file X and file Y, although they operate on different operating systems.

The same can be applied to files which are compiled using different compilers.

According to some embodiments, the features stored in the dictionary are independent of the compiler of the file. Therefore, files which are compiled using different compilers can be fed to the same model of the machine learning algorithm, and this model can provide prospects representative of one or more malware categories to which each of these files belongs, based on said data structure.

According to some embodiments, determination of the category of a file assumed to be a malware is performed in real-time. In particular, the file is converted into a data structure, fed to the machine learning algorithm which provides prospects or a binary result relatively to the category of malware, in real time. The pre-processing of the file before its feeding to the machine learning algorithm (using the dictionary) helps to accelerate processing of the file.

According to some embodiments, determination of the category of malware performed in real time, such as its duration, may not be felt by the user. The user may thus perform his tasks on the system without being aware of the duration of the determination which has been performed.

According to some embodiments, the machine learning algorithm can store a plurality of predictive models (each one can be trained according to the various methods described above). The file can be converted into a data structure, and fed to one or more of these models. Each model can provide prospects representative of one or more malware categories to which said file belongs, and an aggregation of these prospects can be performed to provide a final result.

Figure 17:
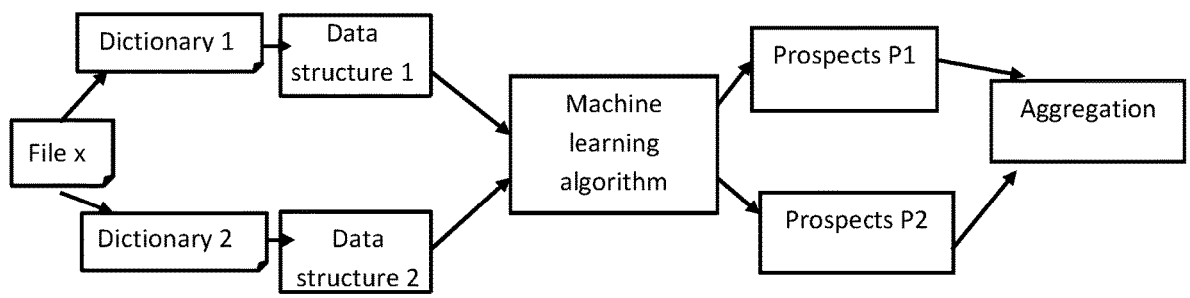
FIG. 17 illustrates an embodiment in which a file is converted into two different data structures using two different dictionaries, and in which the machine learning algorithm provides at least two different prospects representative of a malware category of the file, wherein the two different prospects are aggregated.

A non-limitative example is provided in FIG. 17.

A file is provided and is assumed to constitute malware.

The file can be converted into a first data structure using a first dictionary $D_i$. The first dictionary can be e.g. obtained using the method described in FIGS. 4 and 5 (see dictionary D in FIG. 4A, or D" in FIG. 12A).

The file can be converted into a second data structure using a second dictionary $D_2$. The second dictionary can be e.g. obtained using the method described in FIGS. 6 and 7 (see dictionary D', or D''' in FIG. 12B).

The machine learning algorithm of the malware determination system can provide first prospects $P_1$ providing prospects representative of one or more malware categories to which said file belongs, based on the first data structure.

The machine learning algorithm of the malware determination system can provide second prospects $P_2$ providing prospects representative of one or more malware categories to which said file belongs, based on the second data structure.

The first and second prospects can be aggregated, e.g. by the malware determination system, or by a processing unit. A final decision can be provided, which indicates one or more categories to which the file belongs, according to the malware determination system.

According to some embodiments, the prospects can be aggregated into a binary result using methods such as e.g. a voting method and/or a method based on the confidence of the prospects (these methods for combining the prospects are only examples). According to some embodiments, a neural network aggregates the different prospects provided by the machine learning algorithm for the file, into unique aggregated prospects (such as a unique probability), or into a binary result (for each category, it indicates whether it belongs to this category or not).

According to some embodiments, the malware determination system of a given user can receive an update of the prediction model of the machine learning algorithm from time to time, e.g. through a network. For example, the prediction model can be re-trained in a laboratory, and the updated model can be sent and spread to all the users of the malware determination system. The re-training of the prediction model of the machine learning algorithm can be performed according to the various embodiments described above, and using e.g. a new training set.

According to some embodiments, only the dictionary (or dictionaries) stored in the malware determination system are updated and sent to each user.

According to some embodiments, only the prediction model stored in the malware determination system is updated and sent to each user.

According to some embodiments, both the dictionary (or dictionaries) and the prediction model stored in the malware determination system are updated and sent to each user.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method of training a malware determination system comprising a machine learning algorithm, wherein the malware determination system is configured to identify a category of malware files, the method comprising, by a processing unit and associated memory:
    obtaining a training set comprising a plurality of malware files, wherein these malware files belong to different categories of malware files,
    for each of a plurality of said malware files,
        building a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, feeding the data structure to the machine learning algorithm of the malware determination system, for providing prospects that the malware file belongs to one or more categories of malware, and updating one or more parameters of at least one model used by the machine learning algorithm of the malware determination system, based at least on prospects provided by the machine learning algorithm whether each malware file belongs to one or more categories of malware files, and at least one real category of each malware file, for training said malware determination system to detect category of malware files fed to the malware determination system, wherein the dictionary is built using at least operations (a) to (c):

(a) building at least N first size dictionaries, wherein each first-size dictionary $D_{Ci}$ is associated with a category $C_i$ of malware files, with i from 1 to N, said building comprising, for each category $C_i$, extracting features from malware files of a training set belonging to category $C_i$ and storing them into said dictionary $D_{ci}$, (b) for each of one or more of categories $C_i$, determining specific features of said category $C_i$, comprising at least one of:

one or more features which are specific to said category $C_i$ with respect to all other N−1 categories $C_j$, wherein j is different from i, according to at least one specificity criteria, and one or more features which are specific to malware files of all N−1 categories $C_j$ with respect to features of malware files of category $C_i$, according to at least one specificity criteria, wherein i is different from j, and (c) building said dictionary based at least on one or more of said specific features.

2. The method of claim 1, wherein the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect.

3. The method of claim 1, wherein said dictionary stores, for each of one or more of said categories $C_i$, at least some of features $F_{all/Ci}$ which are specific to malware files of all N−1 categories $C_j$ with respect to features of malware files of category $C_i$, according to at least one second specificity criteria, wherein i is different from j.

4. The method of claim 1, comprising reducing the number of specific features by selecting, among said specific features, at least one of:

one or more features which, in combination, are specific to said category $C_i$ with respect to all other N−1 categories $C_j$, and one or more features which, in combination, are specific to said N−1 categories $C_j$ with respect to category $C_i$, wherein the method comprises building said dictionary based at least on one or more of said reduced number of specific features.

5. A method of determining a category of a malware file, using a malware determination system comprising a machine learning algorithm, the method comprising, by a processing unit and associated memory:

obtaining a file, which is assumed to constitute malware file, by the malware determination system, building a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, feeding the data structure to the machine learning algorithm of the malware determination system, and providing prospects representative of one or more malware categories to which said file belongs, based on said data structure, wherein the dictionary is built using at least operations (a) to (c):

(a) building at least N first size dictionaries, wherein each first-size dictionary $D_{ci}$ is associated with a category $C_i$ of malware files, with i from 1 to N, said building comprising, for each category $C_i$, extracting features from malware files of a training set belonging to category $C_i$ and storing them into said dictionary $D_{ci}$, (b) for each of one or more of categories $C_i$, determining specific features of said category $C_i$, comprising at least one of:

one or more features which are specific to said category $C_i$ with respect to all other N−1 categories $C_j$, wherein j is different from i, according to at least one specificity criteria, and one or more features which are specific to malware files of all N−1 categories $C_j$ with respect to features of malware files of category $C_i$, according to at least one specificity criteria, wherein i is different from j, and (c) building said dictionary based at least on one or more of said specific features.

6. The method of claim 5, wherein the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect.

7. The method of claim 5, wherein the dictionary stores for each of one or more of said categories $C_i$, one or more features $F_{all/Ci}$ which are specific to malware files of all N−1 categories $C_j$ with respect to features of malware files of category $C_i$, according to at least one second specificity criteria, wherein i is different from j.

8. A system of training a malware determination system comprising a machine learning algorithm, wherein the malware determination system is configured to identify a category of malware file, the system comprising a processing unit and associated memory configured to:

obtain a training set comprising a plurality of malware files, wherein these malware files belong to different categories of malware files, for each of a plurality of said malware files, build a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, feed the data structure to the machine learning algorithm of the malware determination system, for providing prospects that the malware file belongs to one or more categories of malware, and update one or more parameters of at least one model used by the machine learning algorithm of the malware determination system, based at least on prospects provided by the machine learning algorithm whether each malware file belongs to one or more of categories of malware files, and at least one real category of each malware file, for training said malware determination system to detect category of malware file fed to the malware determination system, wherein the dictionary is built using at least operations (a) to (c):

(a) building at least N first size dictionaries, wherein each first-size dictionary $D_{ci}$ is associated with a category $C_i$ of malware files, with i from 1 to N, said building comprising, for each category $C_i$, extracting features from malware files of a training set belonging to category $C_i$ and storing them into said dictionary $D_{ci}$, (b) for each of one or more of categories $C_i$, determining specific features of said category $C_i$, comprising at least one of:

one or more features which are specific to said category $C_i$ with respect to all other N-1 categories $C_j$, wherein j is different from i, according to at least one specificity criteria, and one or more features which are specific to malware files of all N-1 categories $C_j$ with respect to features of malware files of category $C_i$, according to at least one specificity criteria, wherein i is different from j, and (c) building said dictionary based at least on one or more of said specific features.

9. The system of claim 8, wherein the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect.

10. The system of claim 8, wherein said dictionary stores, for each of one or more of said categories Ci, at least some of features $F_{all/Ci}$ which are specific to malware files of all N-1 categories $C_j$ with respect to features of malware files of category $C_i$, according to at least one second specificity criteria, wherein i is different from j.

11. The system of claim 8, configured to reduce the number of specific features by selecting, among said specific features, at least one of:

one or more features which, in combination, are specific to said category $C_i$ with respect to all other N-1 categories $C_j$, and one or more features which, in combination, are specific to said N-1 categories $C_j$ with respect to category Ci, wherein the system is configured to build said dictionary based at least on one or more of said reduced number of specific features.

12. A malware determination system comprising a machine learning algorithm, the system comprising a processing unit and associated memory configured to:

obtain a file, which is assumed to constitute a malware file, build a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category $C_i$ with respect to all other N-1 categories $C_j$, with j different from i, according to at least one first specificity criteria, feed the data structure to the machine learning algorithm, and provide prospects representative of one or more malware categories to which said file belongs, based on said data structure, wherein the dictionary is built using at least operations (a) to (c):

(a) building at least N first size dictionaries, wherein each first-size dictionary $D_{ci}$ is associated with a category $C_i$ of malware files, with i from 1 to N, said building comprising, for each category $C_i$, extracting features from malware files of a training set belonging to category $C_i$ and storing them into said dictionary $D_{Ci}$, (b) for each of one or more of categories $C_i$, determining specific features of said category $C_i$, comprising at least one of:

one or more features which are specific to said category $C_i$ with respect to all other N-1 categories $C_j$, wherein j is different from i, according to at least one specificity criteria, and one or more features which are specific to malware files of all N-1 categories $C_j$ with respect to features of malware files of category $C_i$, according to at least one specificity criteria, wherein i is different from j, and (c) building said dictionary based at least on one or more of said specific features.

13. The system of claim 12, wherein the machine learning algorithm is a deep learning algorithm which comprises an input layer, an output layer, and a plurality of hidden layers, wherein the output layer comprises a number of neurons equal to a maximal number of different categories of malware files that the deep learning algorithm can detect.

14. The system of claim 12, wherein the dictionary stores for each of one or more of said categories Ci, at least some of features $F_{all/Ci}$ which are specific to malware files of all N-1 categories $C_j$ with respect to features of malware files of category $C_i$, according to at least one second specificity criteria, wherein i is different from j.

15. A non-transitory storage device readable by a machine, tangibly embodying a program of instructions executable by the machine to perform a method of:

obtaining a training set comprising a plurality of malware files, wherein these malware files belong to different categories of malware files, for each of a plurality of said malware files, building a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category $C_i$ with respect to all other N-1 categories $C_j$, with j different from i, according to at least one first specificity criteria, or for each of one or more of categories $C_i$ out of a plurality of N categories of malware files, with i from 1 to N and N>1, one or more features $F_{Ci/Cj}$ which are specific to said category $C_i$ with respect to another category $C_j$, for all j from 1 to N which are different from i, according to at least one first specificity criteria, feeding the data structure to the machine learning algorithm of the malware determination system, for providing prospects that the malware file belongs to one or more categories of malware, and updating one or more parameters of at least one model used by the machine learning algorithm of the malware determination system, based at least on prospects provided by the machine learning algorithm whether each malware file belongs to one or more categories of malware files, and at least one real category of each malware file, for training said malware determination system to detect category of malware files fed to the malware determination system, wherein the dictionary is built using at least operations (a) to (c):

(a) building at least N first size dictionaries, wherein each first-size dictionary $D_{Ci}$ is associated with a category $C_i$ of malware files, with i from 1 to N, said building comprising, for each category $C_i$, extracting features from malware files of a training set belonging to category $C_i$ and storing them into said dictionary $D_{ci}$, (b) for each of one or more of categories $C_i$, determining specific features of said category $C_i$, comprising at least one of:

one or more features which are specific to said category $C_i$ with respect to all other N−1 categories $C_j$, wherein j is different from i, according to at least one specificity criteria, and one or more features which are specific to malware files of all N−1 categories $C_j$ with respect to features of malware files of category $C_i$, according to at least one specificity criteria, wherein i is different from j, and (c) building said dictionary based at least on one or more of said specific features.

16. A non-transitory storage device readable by a machine, tangibly embodying a program of instructions executable by the machine to perform a method of:

obtaining a training set comprising a plurality of malware files, wherein these malware files belong to different categories of malware files, for each of a plurality of said malware files, building a data structure representative of features present in said file, based on features present in at least one dictionary, wherein said dictionary stores at least, for each of one or more of categories $C_i$ out of a plurality of N categories of malware files, with i from 1 to N and N>2, one or more features which are specific to said category $C_i$ with respect to all other N−1 categories $C_j$, with j different from i, according to at least one first specificity criteria, or for each of one or more of categories $C_i$ out of a plurality of N categories of malware files, with i from 1 to N and N>1, one or more features $F_{Ci/Cj}$ which are specific to said category $C_i$ with respect to another category $C_j$, for all j from 1 to N which are different from i, according to at least one first specificity criteria, feeding the data structure to the machine learning algorithm of the malware determination system, for providing prospects that the malware file belongs to one or more categories of malware, and updating one or more parameters of at least one model used by the machine learning algorithm of the malware determination system, based at least on prospects provided by the machine learning algorithm whether each malware file belongs to one or more categories of malware files, and at least one real category of each malware file, for training said malware determination system to detect category of malware files fed to the malware determination system, wherein the dictionary is built using at least operations (a) to (c):

(a) building at least N first size dictionaries, wherein each first-size dictionary Do is associated with a category $C_i$ of malware files, with i from 1 to N, said building comprising, for each category $C_i$, extracting features from malware files of a training set belonging to category $C_i$ and storing them into said dictionary $D_{ci}$, (b) for each of one or more of categories $C_i$, determining specific features of said category $C_i$, comprising at least one of:

one or more features which are specific to said category $C_i$ with respect to all other N−1 categories $C_j$, wherein j is different from i, according to at least one specificity criteria, and one or more features which are specific to malware files of all N−1 categories $C_j$ with respect to features of malware files of category $C_i$, according to at least one specificity criteria, wherein i is different from j, and (c) building said dictionary based at least on one or more of said specific features.

* * * * *